US007551982B2

(12) United States Patent
Hammerling

(10) Patent No.: US 7,551,982 B2
(45) Date of Patent: Jun. 23, 2009

(54) SYSTEM AND METHOD OF OPTIMIZING RAW MATERIAL AND FUEL RATES FOR CEMENT KILN

(75) Inventor: Dorit Hammerling, Ann Arbor, MI (US)

(73) Assignee: Holcim (US) Inc., Dundee, MI (US)

(*) Notice: Subject to any disclaimer, the term of this patent is extended or adjusted under 35 U.S.C. 154(b) by 615 days.

(21) Appl. No.: 11/231,097

(22) Filed: Sep. 20, 2005

(65) Prior Publication Data

US 2007/0064762 A1 Mar. 22, 2007

(51) Int. Cl.
*G06F 19/00* (2006.01)

(52) U.S. Cl. ........................................ 700/265

(58) Field of Classification Search ............ 700/28–33, 700/108–110, 231, 236, 239–242, 244, 265, 700/285; 705/7–11, 20, 28, 412; 432/36, 432/37, 45; 106/693, 739, 743, 751
See application file for complete search history.

(56) References Cited

U.S. PATENT DOCUMENTS 3,632,018 A * 1/1972 Ross ............................ 222/1
4,026,717 A * 5/1977 Harris et al. ................ 106/743
4,077,763 A 3/1978 Jager et al.
4,299,560 A 11/1981 Nakamura et al.
4,300,879 A 11/1981 Goldmann et al.
4,498,930 A 2/1985 Rake et al.
4,739,714 A 4/1988 LaSpisa et al.
4,794,870 A 1/1989 Visvesvaraya
5,040,972 A 8/1991 Kleinhenz et al.
5,285,376 A 2/1994 Struger et al.
5,347,446 A * 9/1994 Iino et al. ..................... 700/29
5,427,037 A 6/1995 Schaefer et al.
5,523,957 A * 6/1996 Perron et al. ............... 700/274
5,527,387 A * 6/1996 Andersen et al. ........... 106/693
5,873,251 A * 2/1999 Iino ............................ 60/660
5,882,190 A 3/1999 Doumet
5,888,256 A * 3/1999 Morrison ..................... 44/552
5,975,891 A 11/1999 Hundebol
6,050,813 A 4/2000 Doumet
6,142,771 A 11/2000 Doumet
6,183,244 B1 2/2001 Doumet
6,383,283 B1 5/2002 Doumet
6,668,201 B1 12/2003 Bonissone et al.
6,790,034 B1 9/2004 Kearns et al.

(Continued)

FOREIGN PATENT DOCUMENTS

EP 1382905 A1 * 1/2004
WO WO 02/22246 A1 * 3/2002

*Primary Examiner*—M. N. Von Buhr
(74) *Attorney, Agent, or Firm*—Harness, Dickey & Pierce, P.L.C.

(57) ABSTRACT

A system and method of determining clinker composition and optimizing raw material and fuel feed rates for a cement kiln plant is provided. Raw material data, fuel data, clinker kiln dust data, and emissions data are received. At least one of a raw material feed rate, a fuel feed rate, and an expected clinker composition are calculated based on the raw material data, the fuel data, the clinker kiln dust data, and the emission data. At least one of the raw material feed rate, the fuel feed rate, and the expected clinker composition are outputted.

36 Claims, 23 Drawing Sheets

U.S. PATENT DOCUMENTS

| | | | | |
|---|---|---|---|---|
| 2003/0046130 | A1 * | 3/2003 | Golightly et al. | 705/7 |
| 2003/0060993 | A1 * | 3/2003 | Russell et al. | 702/84 |
| 2003/0236721 | A1 * | 12/2003 | Plumer et al. | 705/30 |
| 2005/0132933 | A1 * | 6/2005 | Blum | 106/739 |
| 2005/0278200 | A1 * | 12/2005 | Brawley et al. | 705/4 |
| 2006/0287773 | A1 * | 12/2006 | Andersen et al. | 700/265 |

* cited by examiner

SYSTEM AND METHOD OF OPTIMIZING RAW MATERIAL AND FUEL RATES FOR CEMENT KILN

FIELD OF THE INVENTION

The present invention relates to optimizing raw material feed rates and fuel feed rates for a cement kiln plant system.

BACKGROUND OF THE INVENTION

Cement clinker is produced by feeding a mix of raw materials, such as limestone, into a high temperature rotating kiln. Generally, crushed raw materials are stored on site at a cement plant in raw material storage facilities, such as a raw material silo or other suitable storage means. In addition to limestone, raw materials may include clay and sand, as well as other sources of calcium, silicon, aluminum, iron, and other elements. Raw material sources may be transported from a nearby quarry or other sources.

The various raw material components are fed by a raw material feeder into a grinding and mixing facility, such as a raw mill. Raw material components may also be fed directly to a rotating kiln. The final composition of the raw mix depends on the composition and proportion of the individual raw material components. The proportion of the raw material components in the raw mix depends on the rate at which each component is fed into the raw mill or into the kiln.

The raw mix is heated in the rotating kiln, where it becomes partially molten and forms clinker minerals, or cement clinker. The cement clinker then exits the kiln and is rapidly cooled. The cooler may include a grate that is cooled by forced air, or other suitable heat exchanging means.

Clinker kiln dust may be emitted from the kiln and from the cooler, along with exhaust emissions. For example, clinker kiln dust may become suspended in the forced air used to cool the clinker exiting the kiln. The forced air may be filtered and reclaimed clinker kiln dust from the filter may be fed back into the kiln system as a raw material input.

Fuels such as coal and petroleum coke are used to feed the kiln flame to heat the raw mix in the kiln. Other fuels may include whole tires, tire chips, or other alternative fuels such as liquid wastes and plastics. Fuels may be stored at the cement plant in fuel storage containers, and fed into a fuel mill via a fuel feeder. Gaseous fuels, such as natural gas, may also be used as fuel. Gaseous fuels may be piped to the kiln, and regulated by valves or other suitable flow regulation means. A quality control operator generally monitors the rates at which fuels and raw materials are fed to the kiln.

The composition and properties of the raw materials and fuels determine the final composition of the cement clinker, and contribute to the overall efficiency of the kiln system. For example, the raw materials and fuels each have a certain moisture percentage, indicative of the amount of surface water present. Further, the raw materials each have an associated loss factor. The loss factor is indicative of the amount of water, $CO_2$ and organic matter that exits the raw material as it reaches the high kiln temperatures. Each fuel has an associated heat value and ash factor. The heat value is indicative of the amount of heat the fuel will produce in the kiln. The ash factor is indicative of the amount of fuel ash passed through from the fuel to the final cement clinker composition.

The overall cost of the cement clinker depends on the associated costs, compositions, and properties of the individual raw materials and fuels. Thus, the final composition and total cost of the cement clinker depends on the rates at which raw materials and fuels are fed into the kiln plant system. Therefore, a system and method is needed to optimize the raw material and fuel feed rates, in order to produce a target clinker composition at a minimum cost, based upon all of the composition and efficiency data, as well as other applicable factors.

SUMMARY OF THE INVENTION

The present invention provides a system and method of determining clinker composition and optimizing raw material and fuel rates for a cement kiln. Raw material data, fuel data, clinker kiln dust data, and emissions data are received. At least one of a raw material feed rate, a fuel feed rate, and an expected clinker composition are calculated based on the raw material data, the fuel data, the clinker kiln dust data, and the emission data. At least one of the raw material feed rate, the fuel feed rate, and the expected clinker composition are outputted In one feature, a solution target parameter is received, and at least one of the raw material feed rate and the fuel feed rate are calculated by one of minimizing, maximizing, or matching the solution target parameter.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1A:
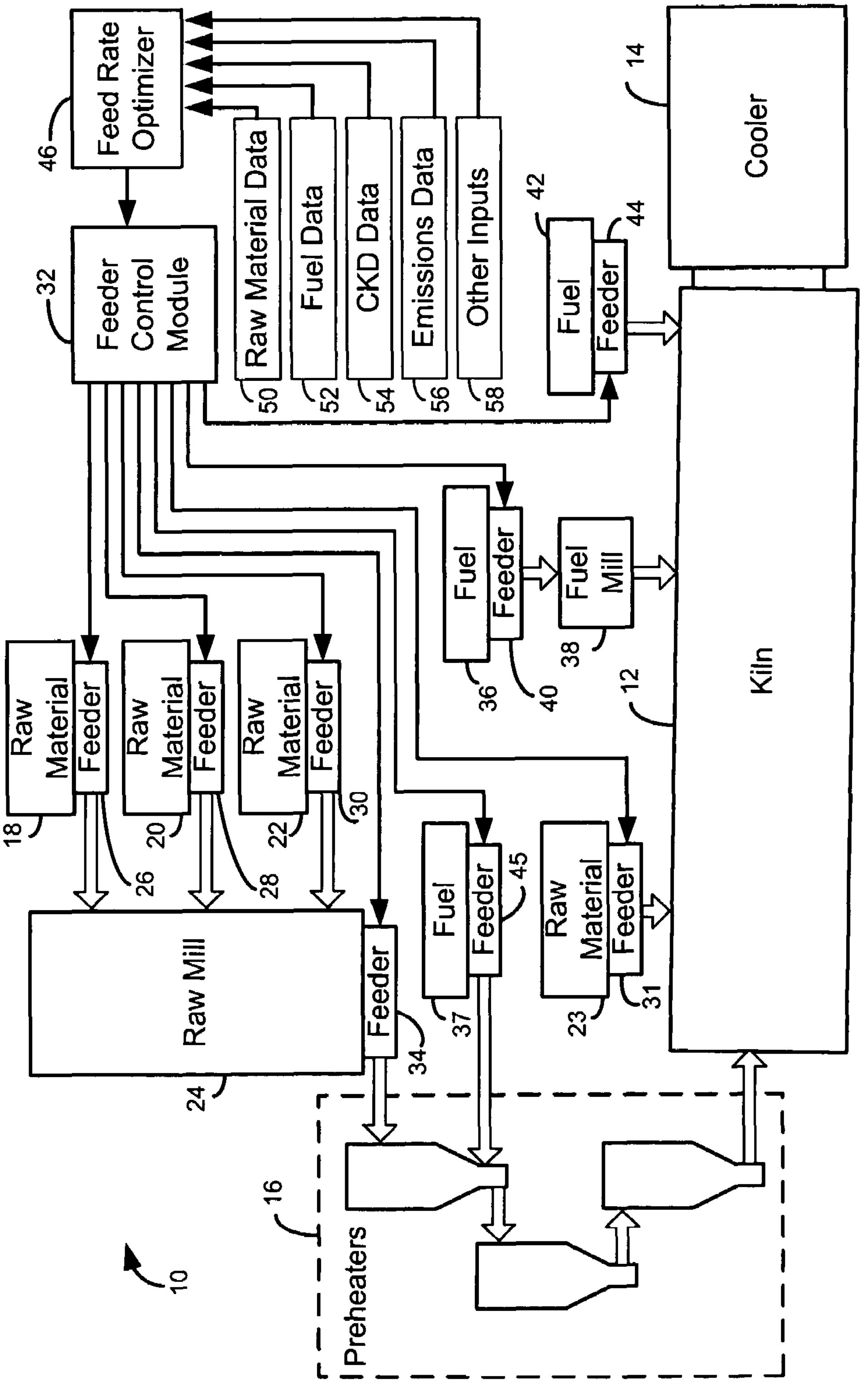
FIG. 1A is a schematic illustration of a dry kiln plant system incorporating a feed rate optimizer.

The following description of the preferred embodiment(s) is merely exemplary in nature and is in no way intended to limit the invention, its application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 1B:
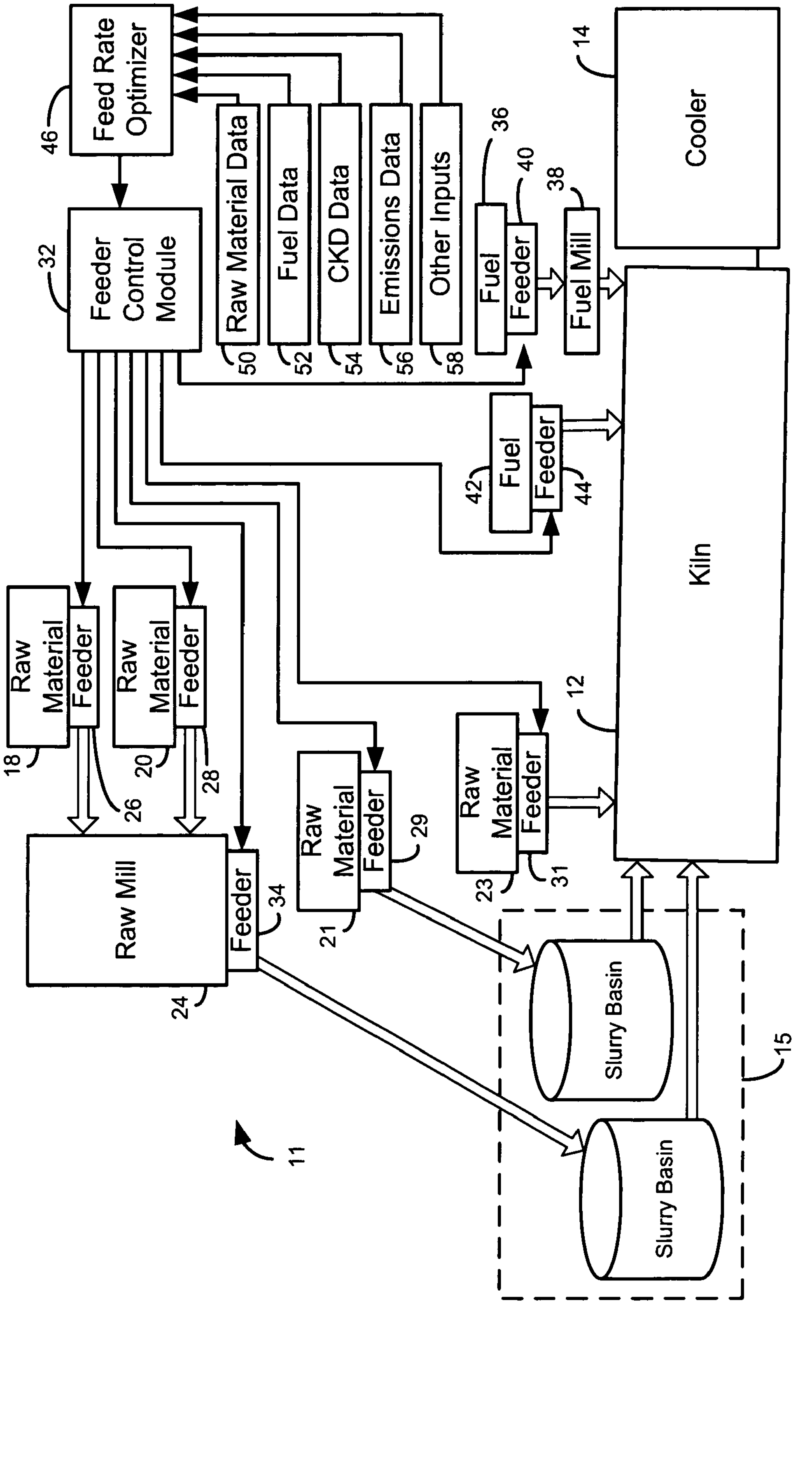
FIG. 1B is a schematic illustration of a wet kiln plant system incorporating a feed rate optimizer.

Referring now to FIGS. 1*a* and 1*b*, a generic dry kiln plant system 10 and a generic wet kiln plant system 11 are shown, respectively. The same reference numbers will be used in FIGS. 1*a* and 1*b* to identify similar elements of the dry kiln plant system 10 and the wet kiln plant system 11. The dry kiln plant system 10 includes a kiln 12, a cooler 14, and pre-heaters 16. The wet kiln plant system 11 includes a kiln 12, a cooler 14, and slurry basins 15. In FIGS. 1*a* and 1*b*, the flow of raw materials and fuel are indicated by open arrows, while the flow of control signals and data are indicated by solid line arrows.

In the dry kiln plant system 10, raw materials, such as limestone and clay, from raw material sources 18, 20, 22, such as storage containers, are fed to a raw mill 24 by controlled raw material feeders 26, 28, 30. Raw materials may also be fed directly to the kiln 12 from a raw material source 23 by a raw material feeder 31. A feeder control module 32 controls the feed rate of the raw material feeders 26, 28, 30, 31. The feeders 26, 28, 30, 31 may be configured with conveyors, or other suitable transporting means. In the raw mill 24, the raw materials are mixed and ground into a raw mix.

In the dry kiln plant system 10, the raw mix is delivered to cyclone pre-heaters 16 from the raw mill 24 via a raw mix feeder 34. The raw mix is preheated before entering the kiln 12. It is understood that the number and types of raw material sources 18, 20, 22, 23 and corresponding feeders 26, 28, 30, 31 may vary depending upon the types of raw materials available. The specific number of raw material sources 18, 20, 22, 23 depicted is for purposes of illustration only. The present invention may be used with any number of raw material sources 18, 20, 22, 23.

In the wet kiln plant system 11, the raw materials are also fed to a raw mill 24 by controlled raw material feeders 26, 28. The raw mix is delivered to slurry basins 15 from the raw mill 24 via a raw mix feeder 34. Raw materials may also be fed directly to the slurry basins 15 from a raw material source 21 by a raw material feeder 29. Raw materials from a raw material source 23 may also be fed directly to the kiln by a raw material feeder 31. The feeder control module 32 controls the feed rate of the raw material feeders 26, 28, 29, 31.

In both systems, fuel, such as coal and petroleum coke, from a fuel source 36 is fed to a fuel mill 38 by a fuel feeder 40 where it is ground and mixed. The fuel is then delivered to the kiln 12. Additionally fuel may be delivered from a fuel source 37 directly to the pre-heaters 16 from a fuel feeder 45. Fuel, such as natural gas, from a fuel source 42 may also be delivered to the kiln 12 directly from a feeder 44. In the case of a gaseous fuel, the feeder 44 may be a control valve that regulates the flow of the gaseous fuel from the fuel source 42 to the kiln 12. It is understood that the number and types of fuel sources 36, 42, and corresponding feeders 40, 44, 45 may vary depending upon the system. The feeder control module 32 controls the feed rate of the fuel feeders 40, 44, 45.

A feed rate optimizer 46 is provided. The feeder control module 32 controls the various feed rates based on input received from the feed rate optimizer 46. As described in more detail below, the feed rate optimizer 46 receives raw material data 50, fuel data 52, clinker kiln dust data 54, emissions data 54, and other inputs 56, and calculates optimized fuel and/or raw material feed rates for a selected solution target, based on selected system constraints.

In the preferred embodiment, the feeder control module 32 and the feed rate optimizer 46 are software modules executed by at least one computer at the kiln plant site. The feeder control module 32 and the feed rate optimizer 46 may also be implemented as software modules executed on separate computers. In such case, the feed rate optimizer 46 may communicate with the feeder control module 32 via a network, such as a local area network or the internet. The feeder control module 32 may reside on a workstation computer, while the feed rate optimizer 46 may reside on a portable laptop, personal data assistant, or other suitable computing means. A quality control operator may manually input the optimized feed rates calculated by the feed rate optimizer 46 into the feeder control module 32. The feed rate optimizer 46 may receive kiln plant data from manual input by a quality control operator or from data signals received from kiln plant sensors.

The exemplary feed rate optimizer 46 is a stand alone module, implemented in software to be executed in a windows environment. A quality control operator utilizing the exemplary feed rate optimizer 46 inputs data from the kiln plant system 10 into the feed rate optimizer 46 and selects desired solution constraints. The feed rate optimizer 46 calculates optimized fuel feed rates, and/or raw material feed rates. As described in more detail below, the feed rate optimizer 46 may also calculate expected clinker composition for given fuel and raw material feed rates. The quality control operator inputs the optimized fuel and/or raw material feed rates into the feeder control module 32.

Figure 2A:
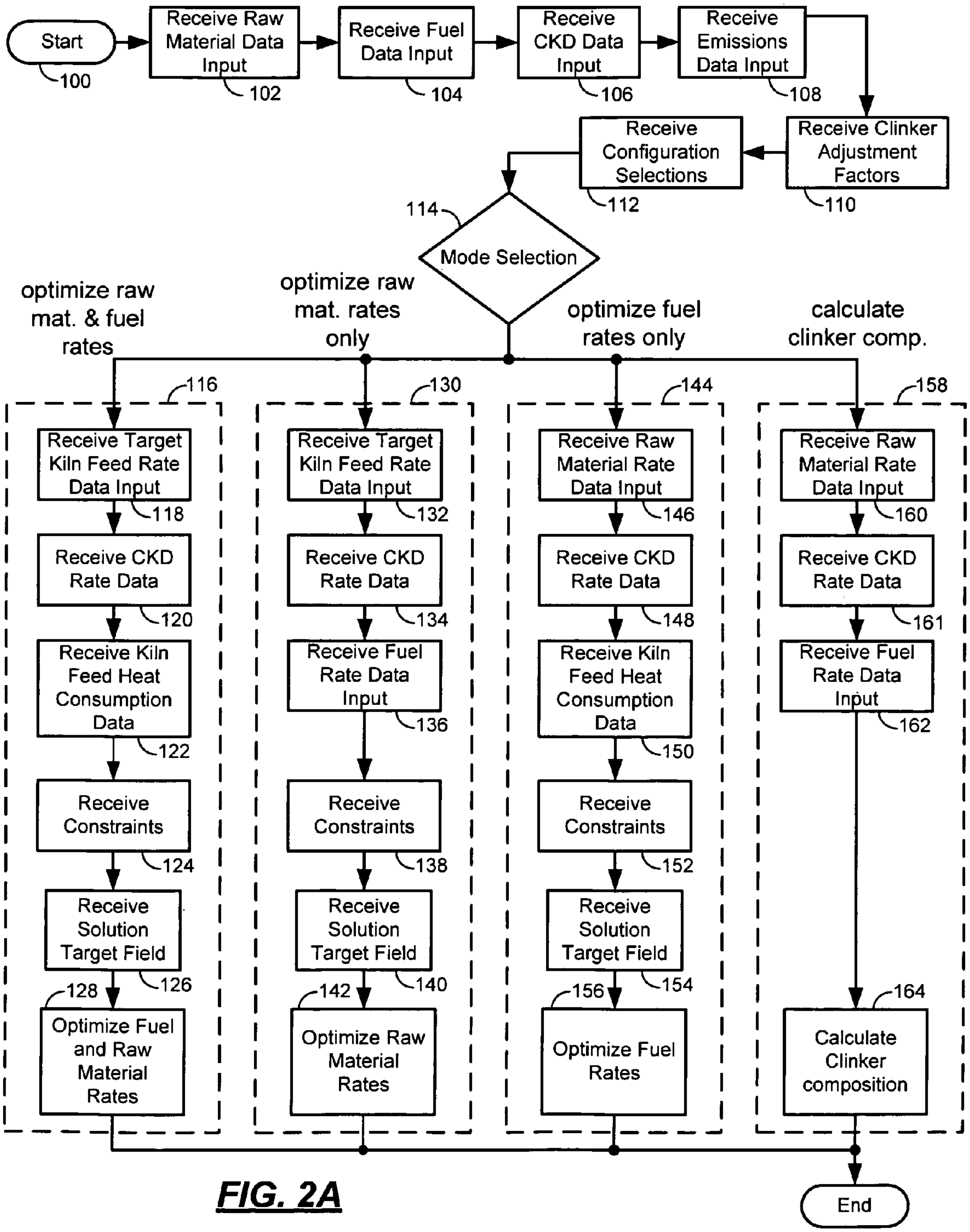
FIG. 2A is a flowchart illustrating steps performed by a feed rate optimizer according to the present invention.

Referring now to FIG. 2A, steps performed by the feed rate optimizer 46 are illustrated. Operation of the feed rate optimizer 46 is also described with reference to FIGS. 3 through 18, which illustrate screen shots of an exemplary feed rate optimizer 46.

Figure 3:
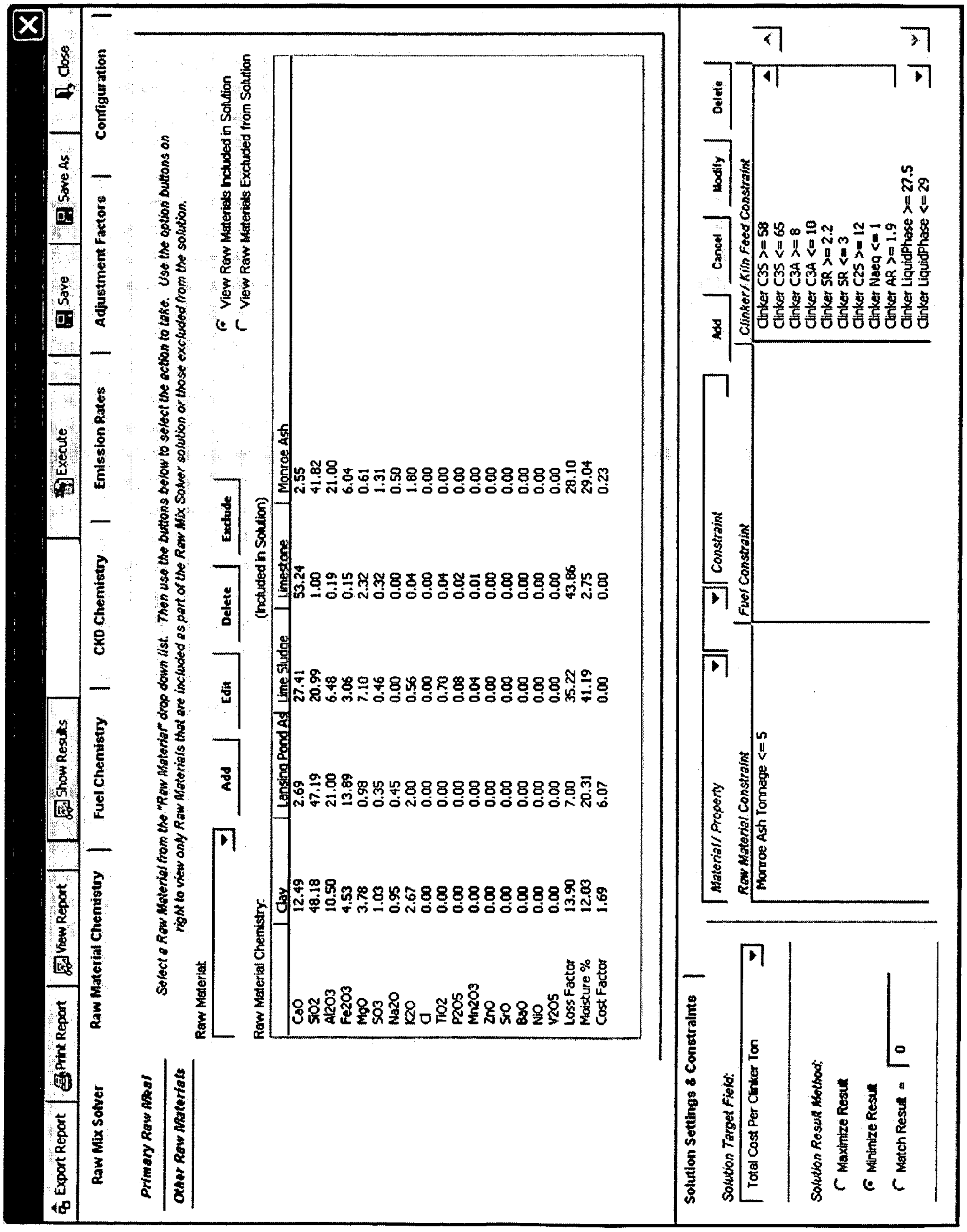
FIG. 3 is a screen-shot illustrating raw material data input for primary raw materials to a feed rate optimizer according to the present invention.

Operation begins in step 100. In step 102, the feed rate optimizer 46 receives raw material data input. (FIG. 3). The raw material data received is based upon actual raw material data measurements, for example, by way of X-ray analysis, or other suitable raw material data measurement means. By clicking on the "Raw Material Chemistry" tab, raw material data is displayed. Raw materials may be added, edited, deleted, or excluded. In FIG. 3, raw materials Clay, Lansing Pond Ash, Lime Sludge, Limestone, and Monroe Ash have been added.

Raw material chemical composition data is displayed for each raw material. The quality control operator inputs the chemical composition of each raw material. Specifically, the percentage of each element present in the raw material is displayed. For example, the "clay" raw material contains 12.49% CaO. The X-ray analysis may not provide percentages that add up to 100%. However, the chemical composition percentages are normalized by the feed rate optimizer 46 during operation.

Figure 4:
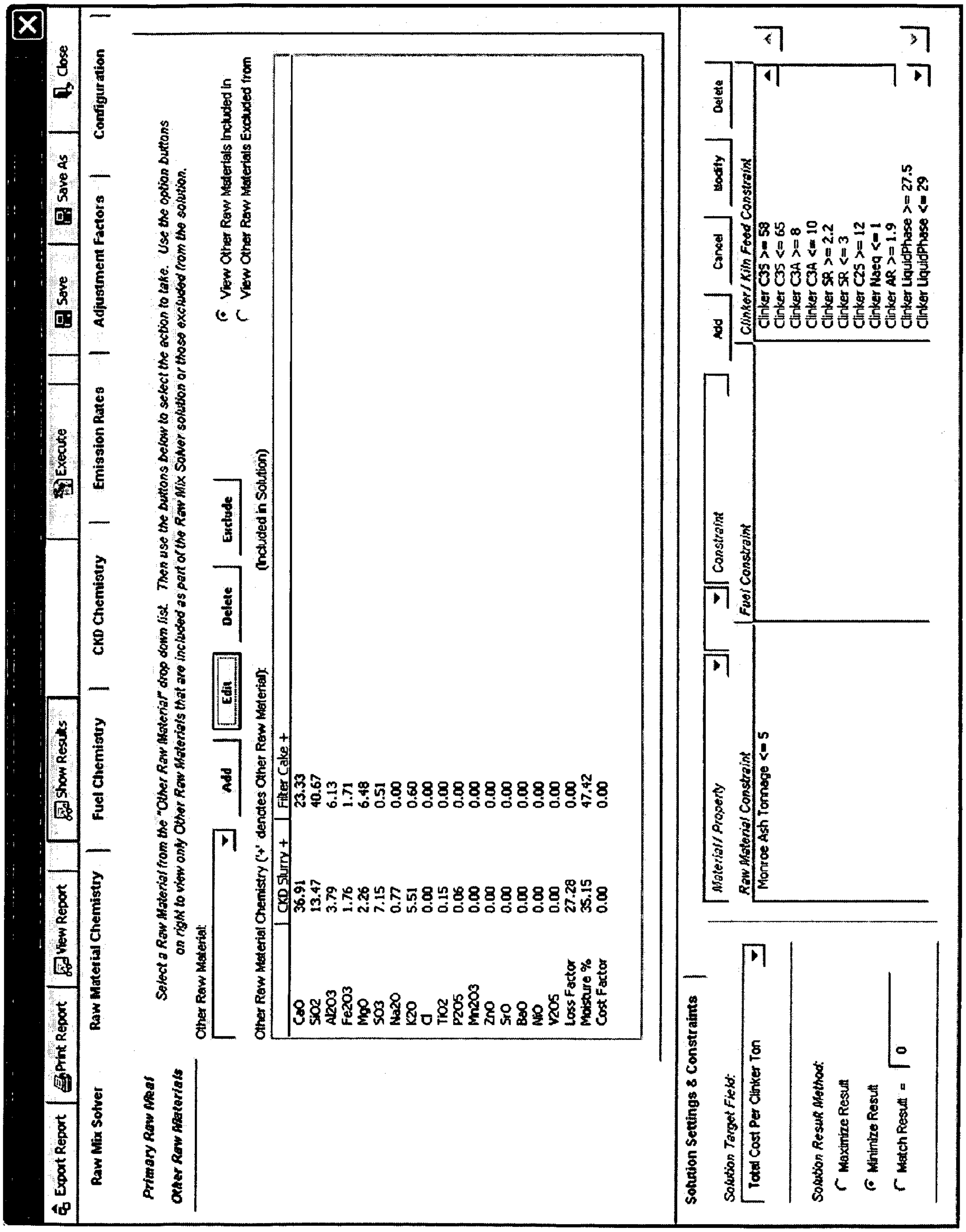
FIG. 4 is a screen-shot illustrating raw material data input for other raw materials to a feed rate optimizer according to the present invention.

A raw material may be excluded, for example, when the raw material is not available. When the raw material later becomes available, it may then be included again. Non-primary, or "other", raw materials may also be displayed by clicking on the "Other Raw Materials" tab. (FIG. 4). Other raw materials may include clinker kiln dust (CKD) slurry, or filter cake.

Loss factor, moisture %, and cost factor data are received for each raw material. The loss factor corresponds to the percentage of the raw material that exits the system when water and organic compounds within the raw material is exposed to the high temperature of the kiln. The moisture % is the percent of surface water in the raw material. The cost factor is the cost of the raw material. In the exemplary embodiment, cost is given in dollars per ton. For example, the cost factor for Clay is $1.69 per ton. Cost may be given in other units, however, provided the same units are consistently used throughout.

Figure 5:
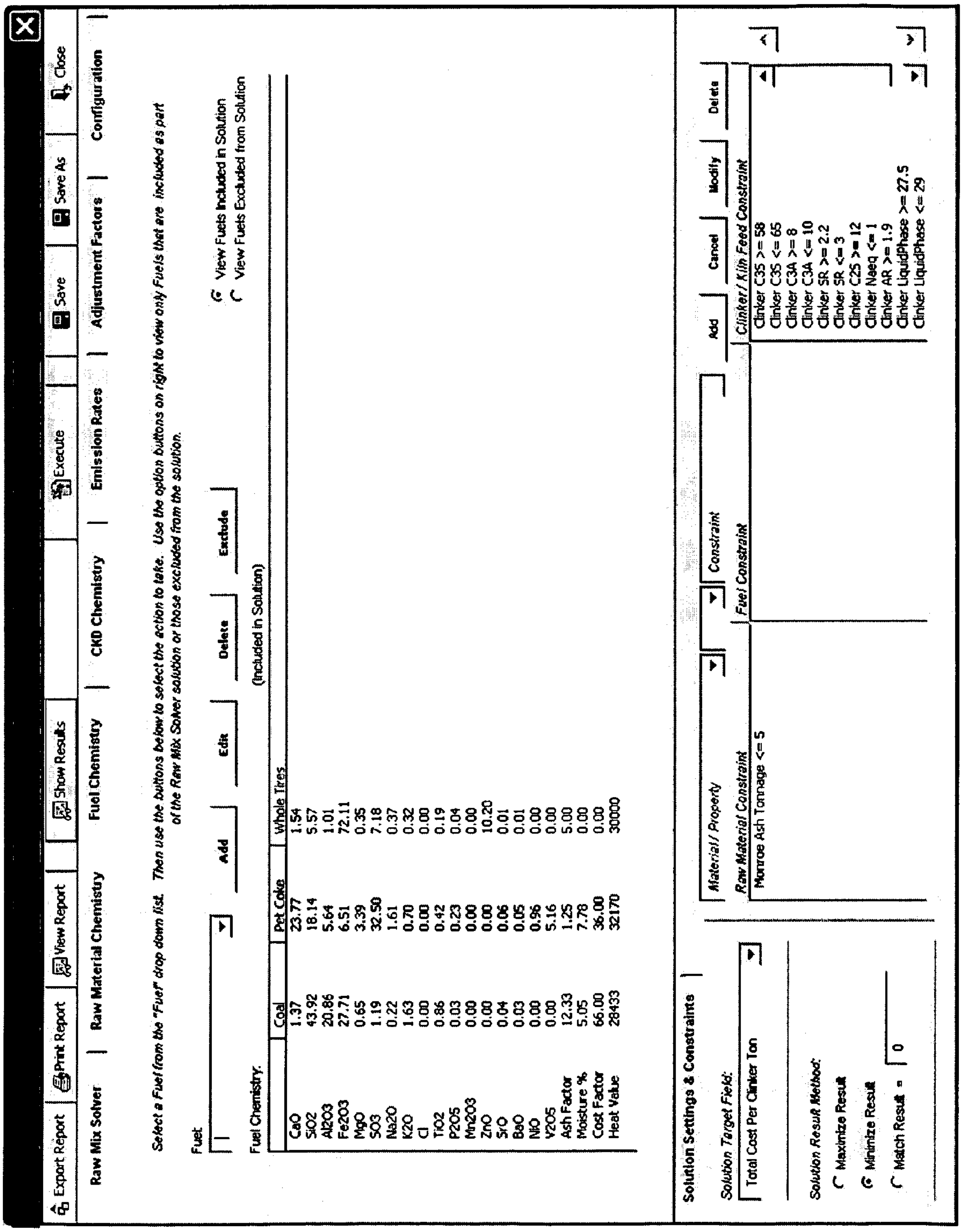
FIG. 5 is a screen-shot illustrating fuel data input to a feed rate optimizer according to the present invention.

In step 104, the feed rate optimizer 46 receives fuel data input. (FIG. 5). The fuel data received is based upon actual fuel data measurements by way of X-ray analysis, or other suitable fuel data measurement means. By clicking on the "Fuel Chemistry" tab, fuel data is displayed. Fuels may be added, edited, deleted, or excluded. Chemical composition data for each fuel is displayed.

The fuel data includes moisture % and cost factor, which are described above. The fuel data also includes an ash factor and a heat value. (FIG. 5). The ash factor corresponds to the expected percentage of the fuel that will end up in the cement clinker in the form of fuel ash. The heat value corresponds to the amount of heat expected to be produced from the fuel. In the exemplary embodiment the heat value is given in mega-joules (MJ's) per ton. Heat value may be given in other units, provided the same units are used throughout.

Figure 6:
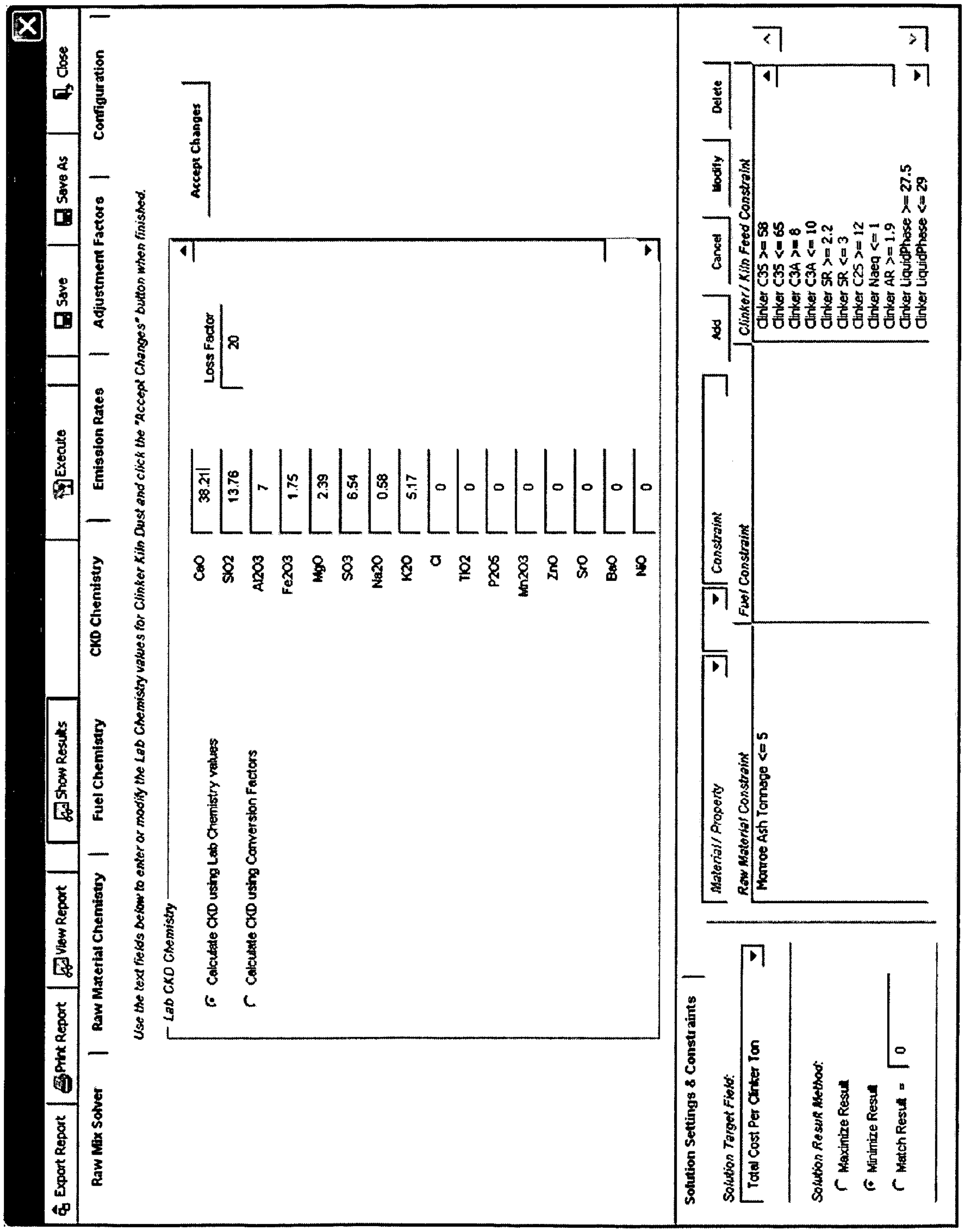
FIG. 6 is a screen-shot illustrating clinker kiln dust data input to a feed rate optimizer according to the present invention.

In step 106, the feed rate optimizer 46 receives CKD data input. (FIG. 6). The CKD data received is based upon actual CKD data measurements, for example, by way of X-ray analysis, or other suitable CKD data measurement means. By clicking on the "CKD Chemistry" tab, CKD data is displayed. The CKD composition and CKD loss factor data are inputted based on actual CKD composition measurements.

Figure 7:
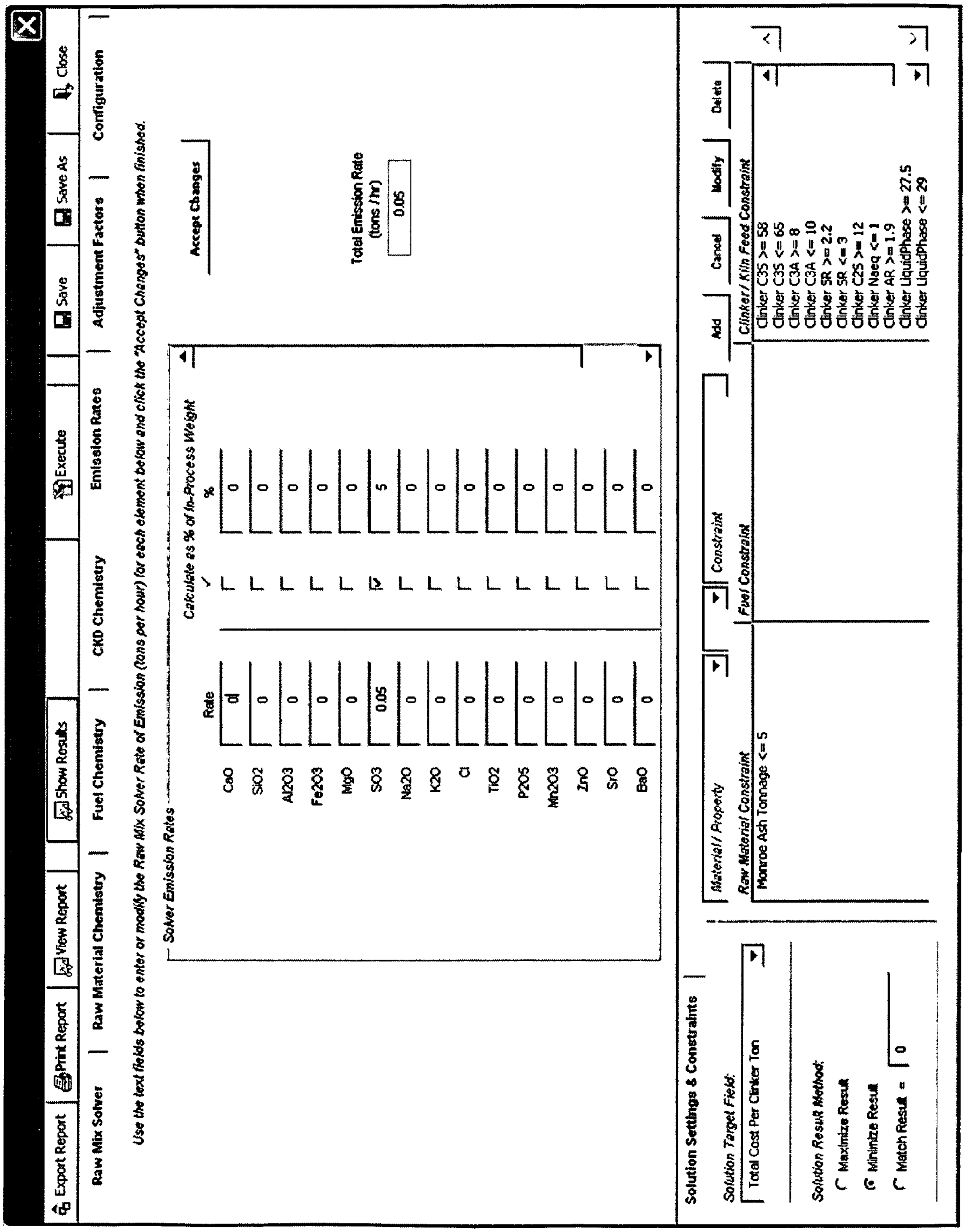
FIG. 7 is a screen-shot illustrating emission data input to a feed rate optimizer according to the present invention.

In step 108, the feed rate optimizer 46 receives emissions data input. (FIG. 7). The emissions data received is based upon actual emissions data measurements, for example, by way of continuous emission monitors, or other suitable emissions data measurement means. By clicking on the "Emission Rates" tab, emissions data is displayed. Emissions data may be received as a tons per hour rate, or as a percentage of the in-process weight. For example, a measured emission of 0.05 tons per hour of $SO_3$, may be received. Alternatively, if emissions include 5% of the $SO_3$ entering the kiln, then 5% may be received as a % of In-Process Weight. The feed rate optimizer 46 will then display the corresponding tons per hour rate. In addition, the total emissions rate, in tons per hour, is also displayed.

Figure 8:
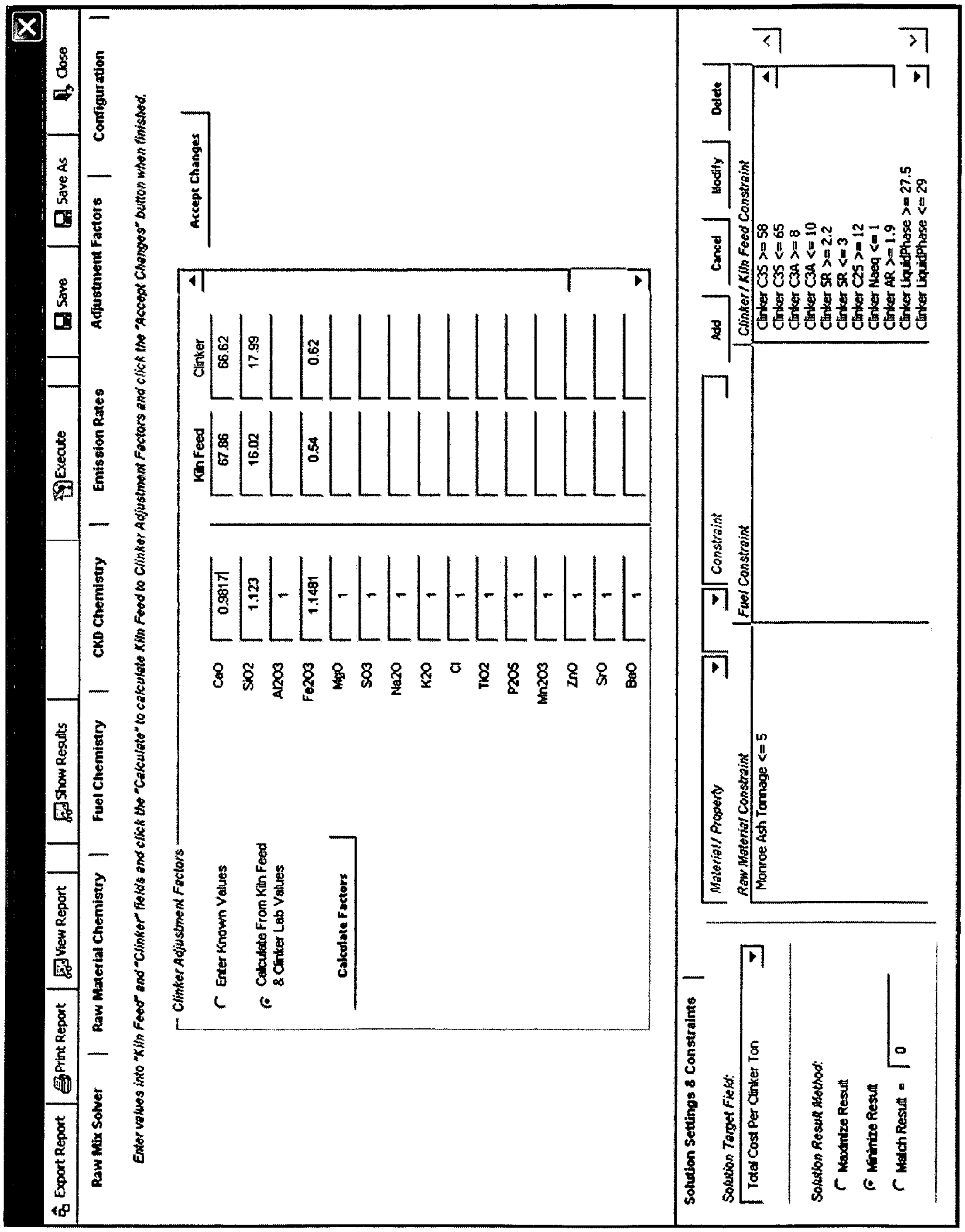
FIG. 8 is a screen-shot illustrating adjustment factor input from kiln feed and clinker lab values to a feed rate optimizer according to the present invention.
Figure 9:
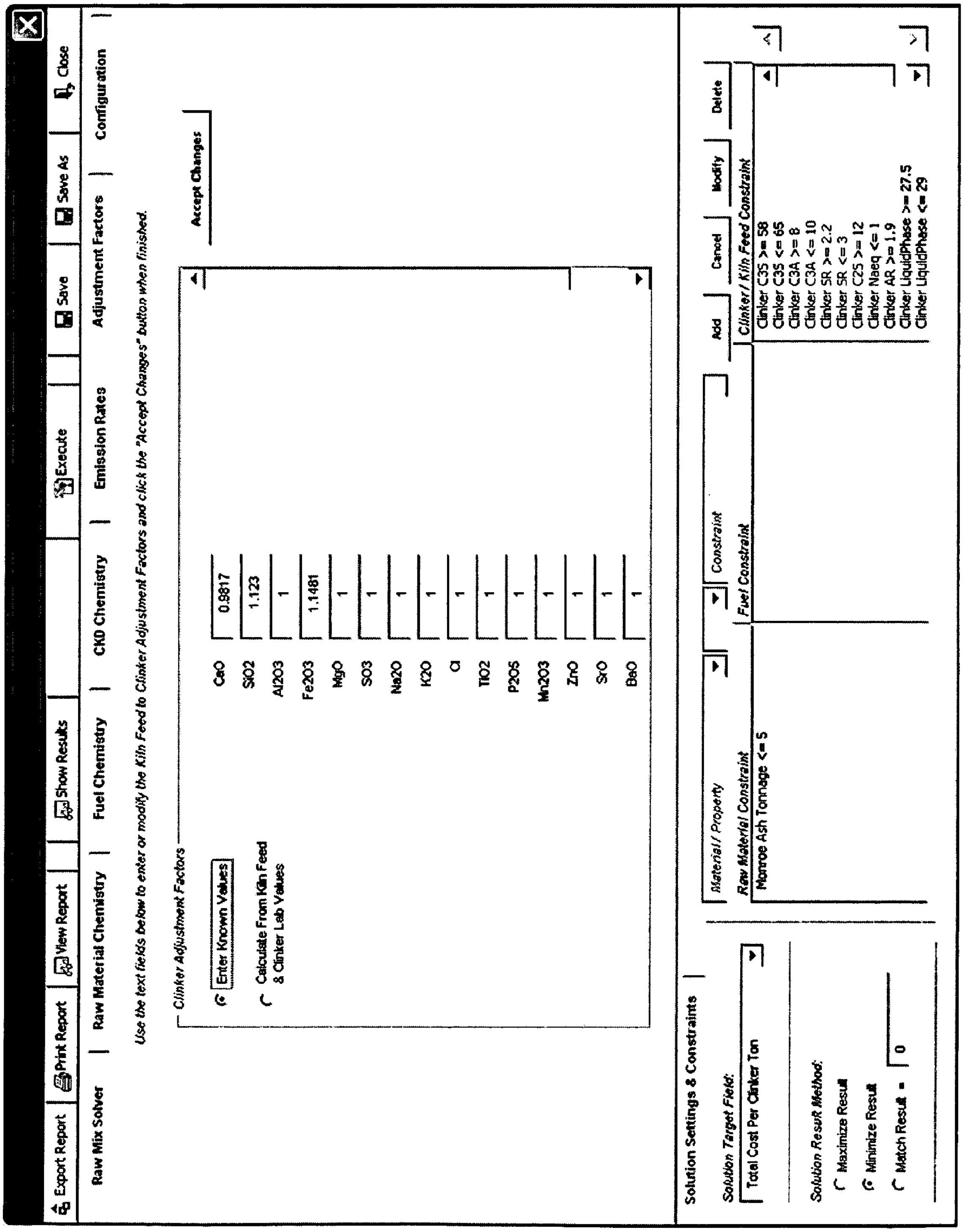
FIG. 9 is a screen-shot illustrating adjustment factor input for known values to a feed rate optimizer according to the present invention.

The feed rate optimizer 46 operates on a conservation of matter basis, meaning that raw materials and fuel entering the kiln 12 must exit the kiln 12 in the form of cement clinker, CKD, emissions, etc. However, in practice the final cement clinker composition may not precisely correspond to the expected cement clinker composition. For this reason, the feed rate optimizer 46 receives clinker adjustment factors in step 110. (FIG. 8). By clicking on the "Adjustment Factors" tab, clinker adjustment factors are displayed. The adjustment factors may be calculated based on the composition of the raw mix, or kiln feed, and the composition of the cement clinker. For example, if the raw mix composition is such that 67.86 tons per hour of CaO is entering the kiln 12, and if the cement clinker composition is such that 66.62 tons per hour of CaO is exiting the kiln 12, the calculated adjustment factor for CaO is 0.9817. (FIG. 8). Alternatively, the adjustment factors may be entered directly. (FIG. 9).

Figure 10:
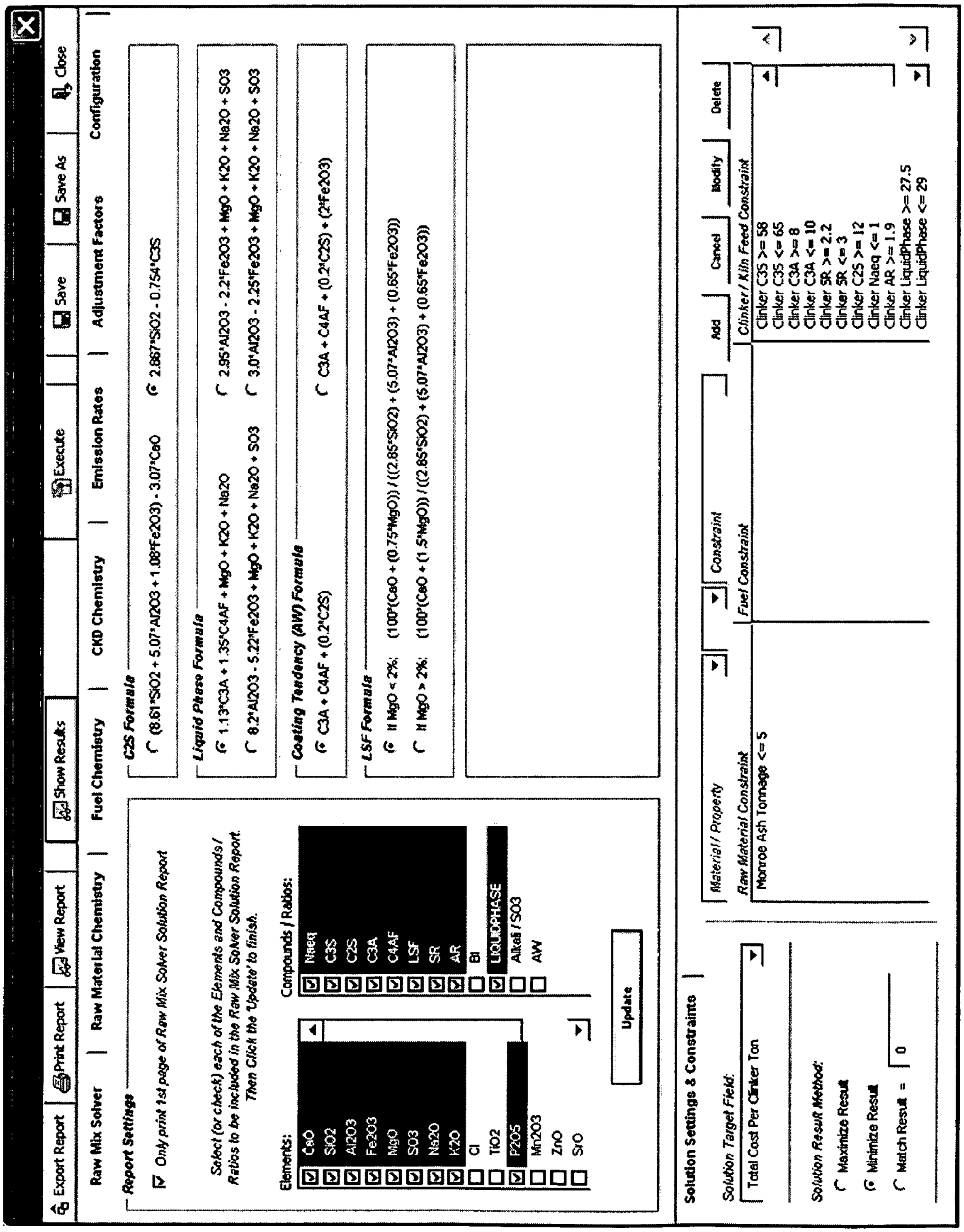
FIG. 10 is a screen-shot illustrating configuration input to a feed rate optimizer according to the present invention.

The feed rate optimizer 46 is configured in step 112. (FIG. 10). Specific formulas used by the feed rate optimizer 46 are selected. A dicalcium silicate, or $C_2S$, formula is selected. The $C_2S$ formula is used by the feed rate optimizer 46 to determine the crystalline makeup of the cement clinker. One of the following $C_2S$ formulas may be selected:

$$(8.61*SiO_2+5.07*Al_2O_3+1.08*Fe_2O_3)-3.07*CaO; \text{ or}$$

$$2.867*SiO_2-0.754*C_3S. \quad \text{(FIG. 10).}$$

The selection of the $C_2S$ formula may be a matter of preference of the quality control operator, or a matter of kiln plant policies and procedures.

The liquid phase formula is selected. The liquid phase formula is used by the feed rate optimizer 46 to determine the amount of raw mix that turns to liquid in the kiln 12. One of the following liquid phase formulas may be selected:

$$1.13*C_3A+1.35*C_4AF+MgO+K_2O+Na_2O;$$

$$2.95*Al_2O_3-2.2*Fe_2O_3+MgO+K_2O+Na_2O+SO_3;$$

$$8.2*Al_2O_3-5.22*Fe_2O_3+MgO+K_2O+Na_2O+SO_3; \text{ or}$$

$$3.0*Al_2O_3-2.25*Fe_2O_3+MgO+K_2O+Na_2O+SO_3. \quad \text{(FIG. 10).}$$

The selection of the liquid phase formula may be a matter of preference of the quality control operator, or a matter of kiln plant policies and procedures.

The coating tendency (AW) formula is selected. The coating tendency formula is used by the feed rate optimizer 46 to determine the amount of raw mix that coats the inside of the kiln 12. One of the following coating tendency formulas may be selected:

$$C_3A+C_4AF+(0.2*C_2S);\text{ or}$$

$$C_3A+C_4AF+(0.2*C_2S)+(2*Fe_2O_3). \quad \text{(FIG. 10).}$$

The selection of the coating tendency formula may be a matter of preference of the quality control operator, or a matter of kiln plant policies and procedures.

The lime saturation factor (LSF) formula is selected. Generally, if the amount of MgO in the cement clinker is less than 2%, then the following formula is used to determine the lime saturation factor:

$$(100*(CaO+(0.75*MgO))/((2.85*SiO_2)+(5.07*Al_2O_3)+(0.65*Fe_2O_3)). \quad \text{(FIG. 10).}$$

If the amount of MgO in the cement clinker is greater than 2%, then the following formula is used:

$$(100*(CaO+(1.5*MgO))/((2.85*SiO_2)+(5.07*Al_2O_3)+(0.65*Fe_2O_3)). \quad \text{(FIG. 10).}$$

The selection of the LSF formula may be a matter of preference of the quality control operator, or a matter of kiln plant policies and procedures.

The elements and compounds to be displayed in the final report may also be selected during configuration. (FIG. 10). Elements and compounds that are "checked" will be displayed in the final report.

In step 114, the mode selection is received. (FIGS. 11-14). The feed rate optimizer 46 may operate in four distinct modes. First, the feed rate optimizer may calculate both optimized raw material and fuel feed rates. Second, the feed rate optimizer may calculate an optimized raw material feed rate only, with the fuel feed rate being inputted. Third, the feed rate optimizer may calculate an optimized fuel rate only, with the raw material feed rate being inputted. Fourth, the feed rate optimizer may calculate the expected clinker composition resulting, with both the raw material and fuel feed rates being inputted. When the "Raw Mix Solver" tab is selected, the desired mode is inputted by checking the appropriate Calculation Mode boxes (FIGS. 11-14).

Figure 11:
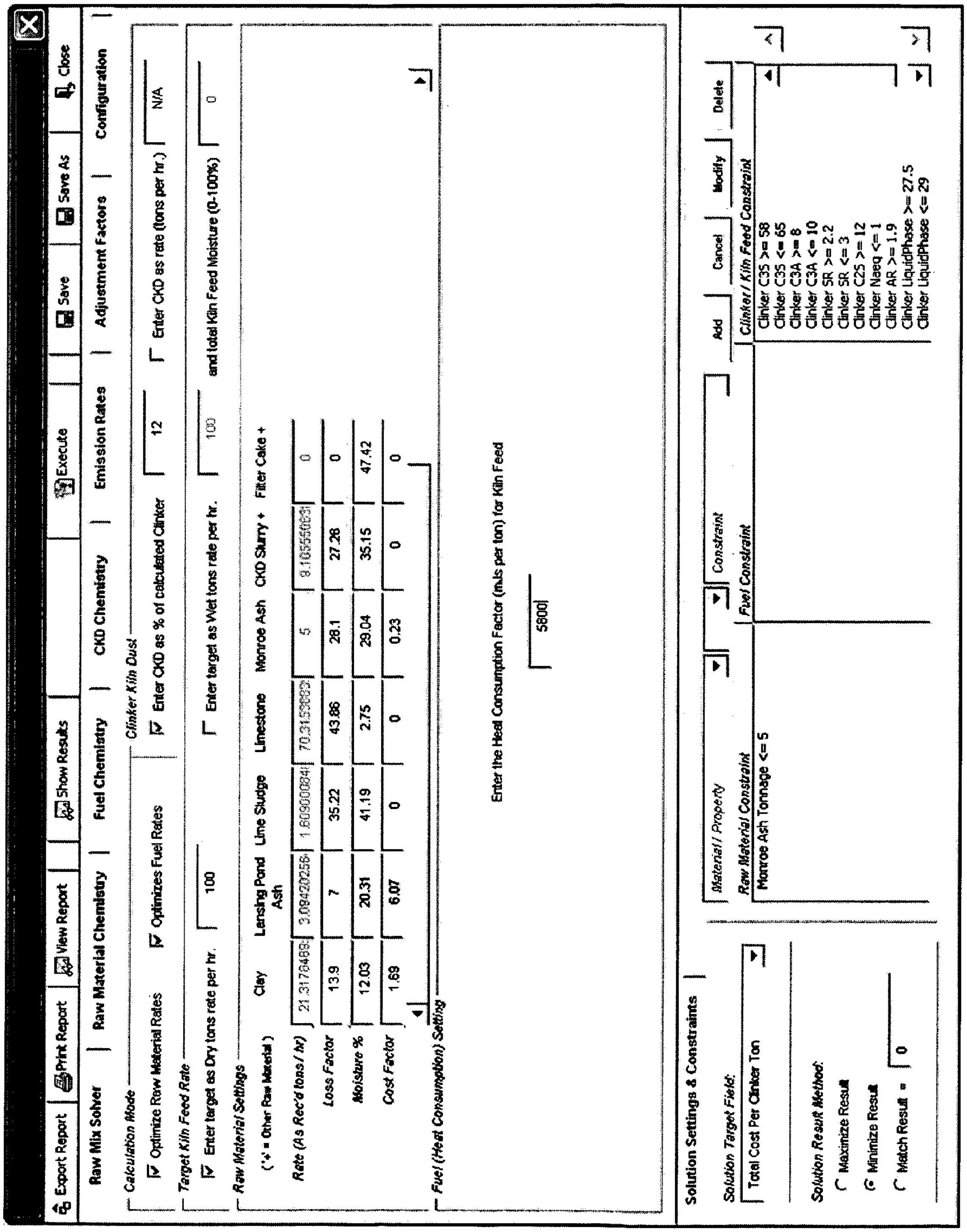
FIG. 11 is a screen-shot illustrating a calculation mode set to optimize raw material rates and optimize fuel rates for a feed rate optimizer according to the present invention.

When both raw material feed rates and fuel feed rates are selected for optimization in step 114, the feed rate optimizer proceeds with grouped steps 116 (FIG. 11). The feed rate optimizer 46 receives target kiln feed rate data in step 118. (FIG. 11). The target kiln feed rate data indicates the desired rate at which the raw mix is fed into the kiln 12. The target kiln feed rate may be in dry tons per hour for a dry kiln plant system 10, or in wet tons per hour for a wet kiln plant system 11. When the target kiln feed rate is in wet tons per hour, the total kiln feed moisture percentage must also be specified. (FIG. 11). The feed rate optimizer 46 calculates raw material feed rates that will result in a raw mix feed rate that satisfies the target kiln feed rate.

In step 120, the feed rate optimizer 46 receives CKD rate data. (FIG. 11). The CKD rate may be given as a percentage of the calculated cement clinker, or as a rate in tons per hour. For example, if 12% of the cement clinker is given off as CKD, then 12% may be specified as the percentage of calculated clinker. (FIG. 11).

In step 122 the heat consumption factor data for the kiln feed is received. The heat consumption factor refers to the target heat consumption desired and is specified in MJ's per ton. (FIG. 11).

Figures 2B, 2C, 2D:
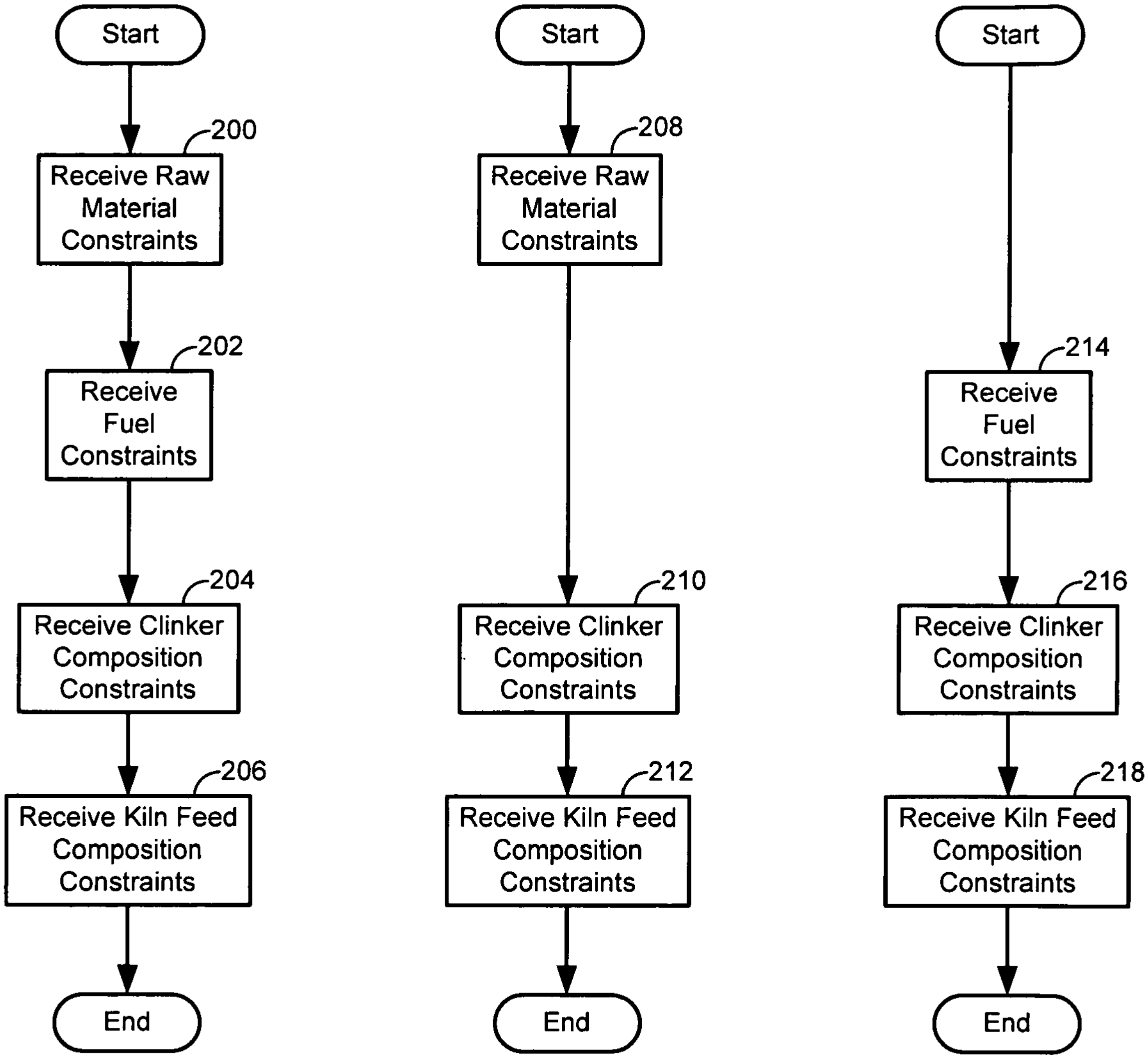
FIG. 2B is a flowchart illustrating steps performed by a feed rate optimizer according to the present invention.
FIG. 2C is a flowchart illustrating steps performed by a feed rate optimizer according to the present invention.
FIG. 2D is a flowchart illustrating steps performed by a feed rate optimizer according to the present invention.

Constraints are received by the feed rate optimizer 46 in step 124. Referring now to FIG. 2B, steps for receiving constraints for optimization of both raw material and fuel feed rates are displayed. As can be appreciated, steps displayed in FIG. 2B are encapsulated by step 124 of FIG. 2A. Raw material constraints are received in step 200. The quality control operator may specify, for example, that less than 5 tons per hour of a raw material, such as Monroe ash, may be used. (FIG. 11). Likewise, fuel constraints are received in step 202.

Figure 15:
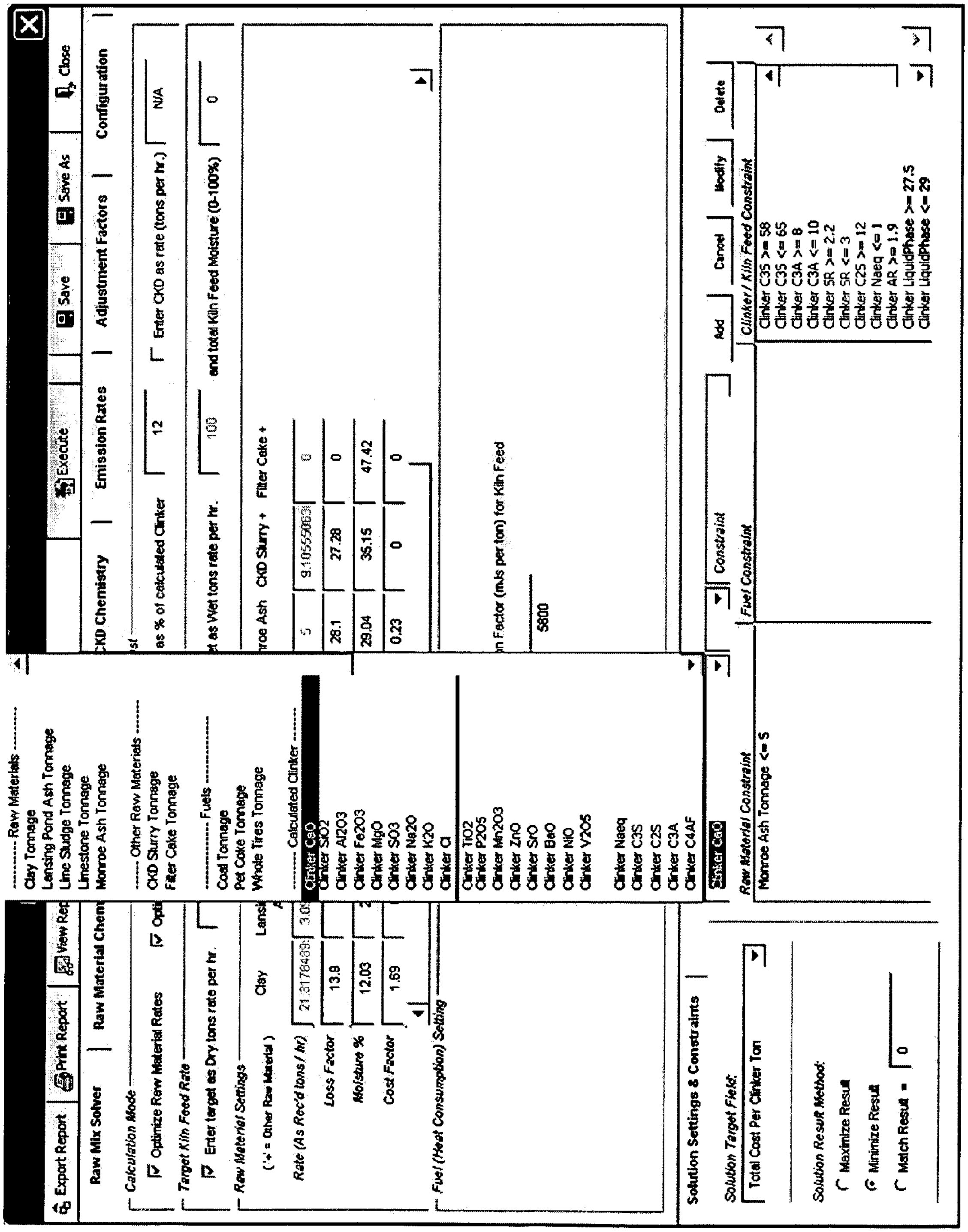
FIG. 15 is a screen-shot illustrating constraint input to a feed rate optimizer according to the present invention.
Figure 16:
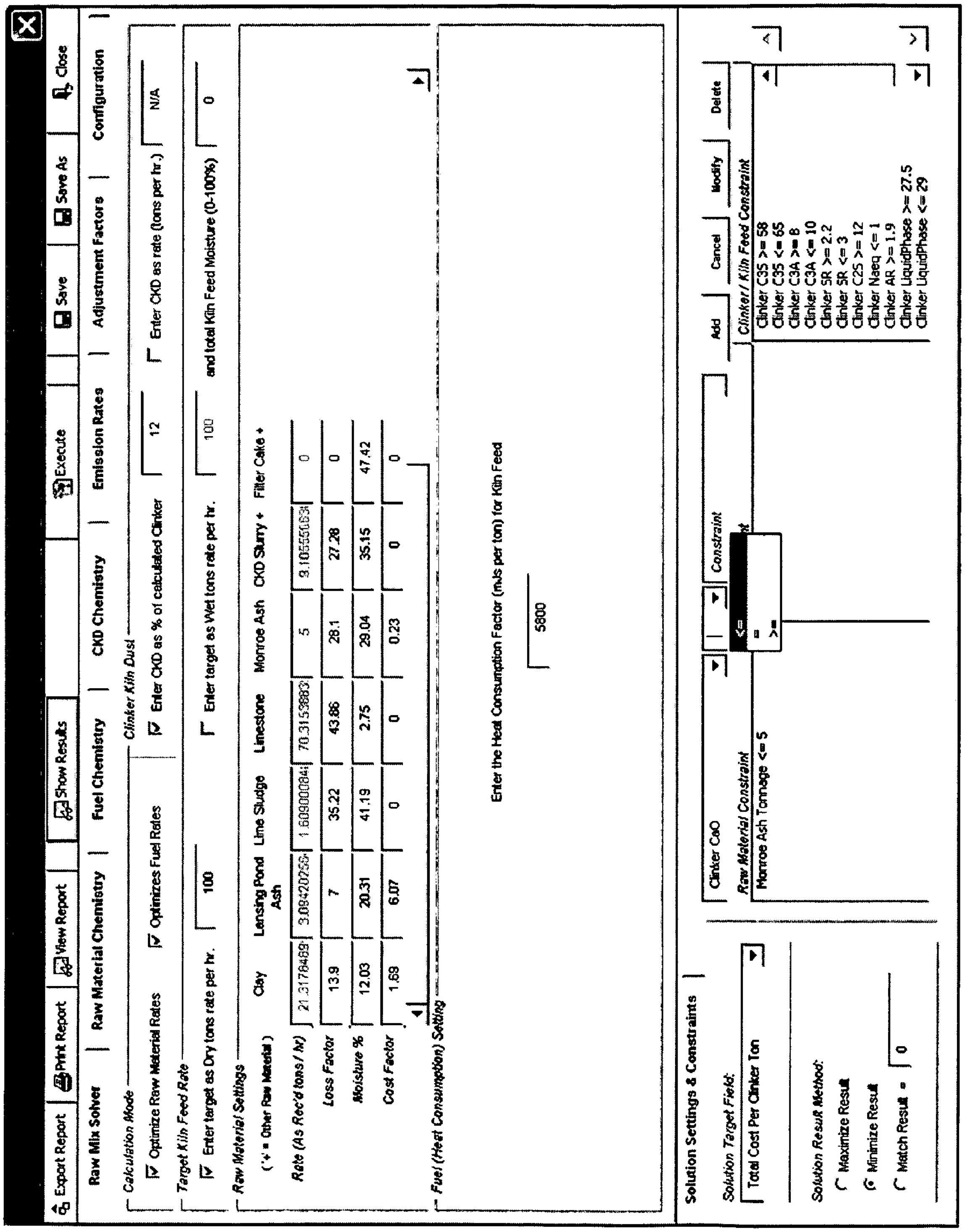
FIG. 16 is a screen-shot illustrating constraint operator input to a feed rate optimizer according to the present invention.

Clinker composition constraints are received in step 204. (FIGS. 15 and 16). For example, the quality control operator may specify that the clinker composition must contain more than 58% $C_3S$ and less than 65% $C_3S$. When executed, the feed rate optimizer will seek a feed rate solution that results in a cement clinker composition satisfying those constraints. Raw mix, or kiln feed, composition constraints are received in step 206.

Figure 17:
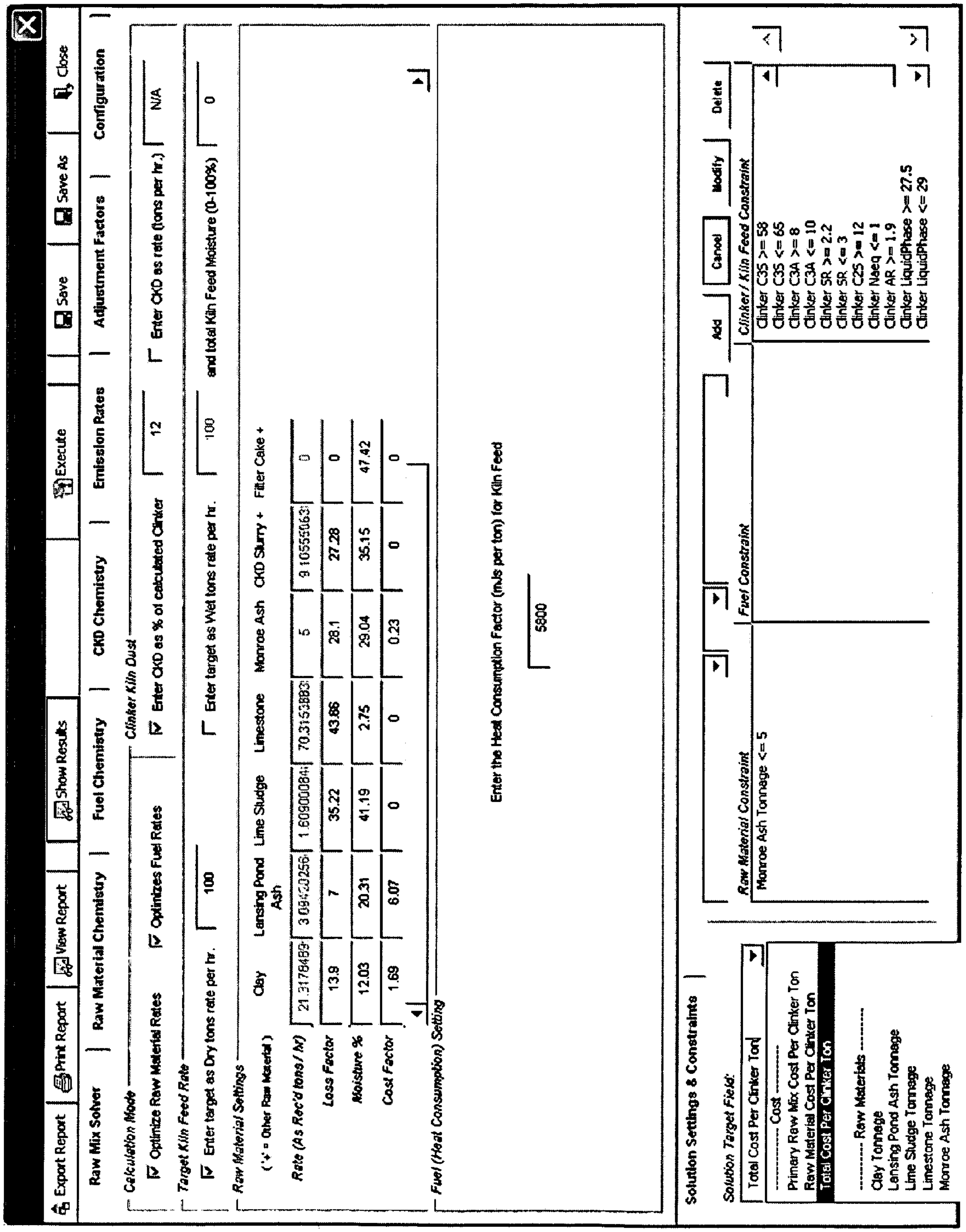
FIG. 17 is a screen-shot illustrating solution target field input to a feed rate optimizer according to the present invention.

Referring again to FIG. 2A, the solution target field is received in step 126. (FIGS. 11 and 17). The quality control operator may select the target field to be maximized or minimized. In addition, the quality control operator may select the target field to match a desired result. For example, the quality control operator may select the target field to be total cost per clinker ton. Further, the quality control operator may specify that the target field, total cost per clinker ton, is to be minimized. (FIGS. 11 and 17). Other target fields may include primary raw mix cost per clinker ton, raw material cost per clinker ton, or other raw material amounts. (FIG. 17).

When all of the data and constraints are received, fuel and raw material feed rates are optimized for the selected target field in step 128 when the user presses the "Execute" button (FIG. 11). The feed rate optimizer operates on a conservation of matter basis, and essentially determines an optimized feed rate for fuel and raw materials, based on the data input, including composition and cost data, as well as the constraints input. The optimized fuel and raw material feed rate solutions provide the quality control operator with fuel and/or raw material feed rates that will generate a cement clinker composition that meets the specified constraints. The solution rates will be optimized according to the specified target field.

Figure 12:
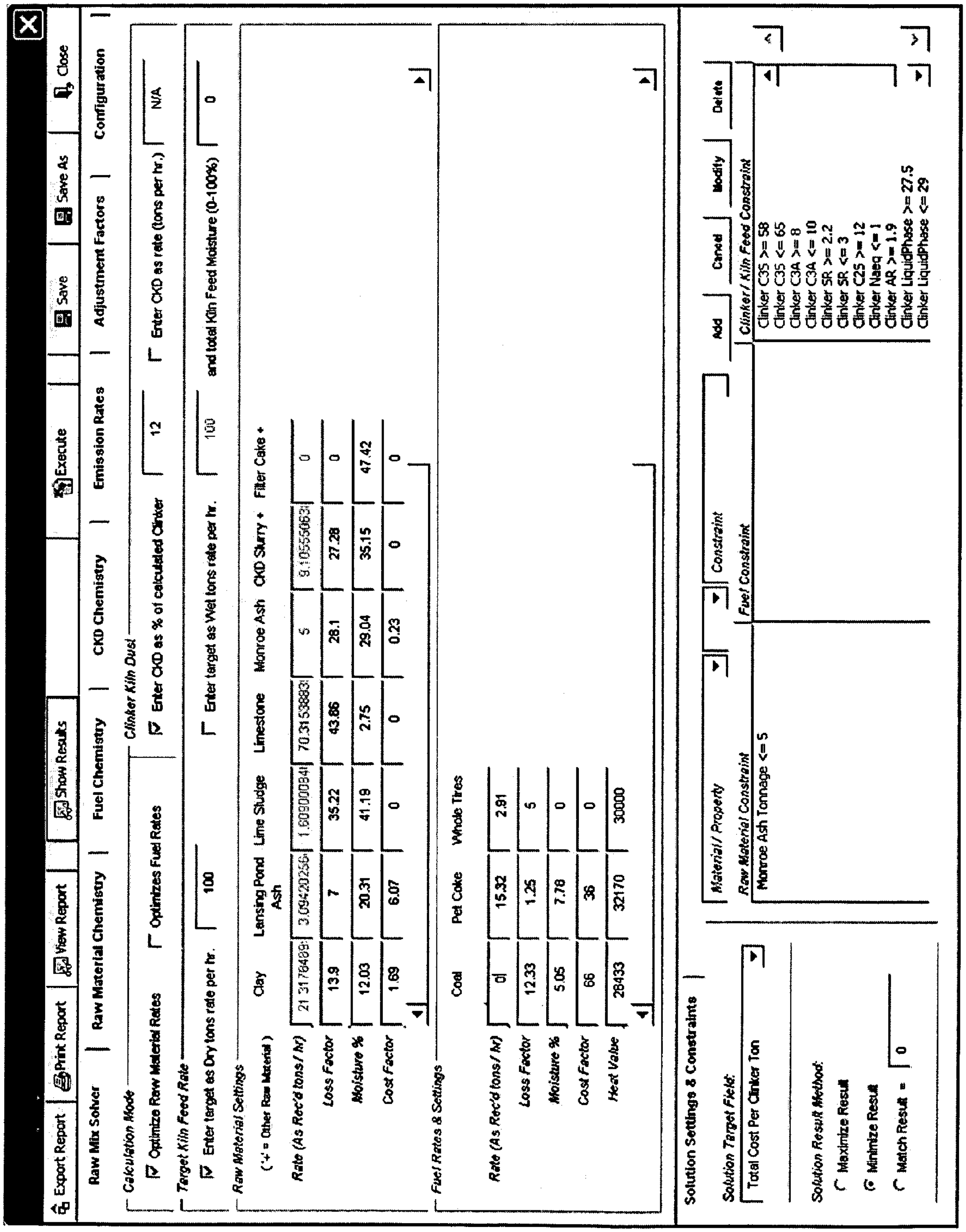
FIG. 12 is a screen-shot illustrating a calculation mode set to optimize raw material rates only for a feed rate optimizer according to the present invention.

When raw material feed rates only are selected for optimization in step 114, the feed rate optimizer proceeds with grouped steps 130 (FIG. 12). The feed rate optimizer 46 receives target kiln feed rate data in step 132. (FIG. 12). The target kiln feed rate data is described above with reference to step 118. The feed rate optimizer 46 receives CKD rate data in step 134. (FIG. 12). CKD rate data is described above with reference to step 120. The feed rate optimizer receives fuel rate data in step 136. (FIG. 12). The feed rates for the various fuels are inputted by the user. (FIG. 12). The feed rates inputted in step 136 correspond to the feed rates of the various fuel feeders 40, 44, 45. In this way, optimized raw material feed rates are calculated based on the inputted fuel feed rates.

Constraints are received by the feed rate optimizer 46 in step 138. Referring now to FIG. 2C, steps for receiving constraints for optimization of raw material rates only are displayed. As can be appreciated, steps displayed in FIG. 2C are encapsulated by step 138 of FIG. 2A. Raw material constraints are received in step 208. Raw material constraints are described above with reference to step 200. Clinker composition constraints are received in step 210. Clinker composition constraints are described above with reference to step 204. Kiln feed composition constraints are received in step 212. Kiln feed composition constraints are described above with reference to step 206. Fuel constraints are not received, as specified fuel feed rates were received in step 136 (FIG. 2A).

Referring again to FIG. 2A, the solution target field is received in step 140. The solution target field is described above with reference to step 126.

In step 142, the feed rate optimizer calculates optimized raw material feed rates based on the selected inputs and constraints, and based on the inputted fuel feed rate, when the user presses the "Execute" button (FIG. 12).

Figure 13:
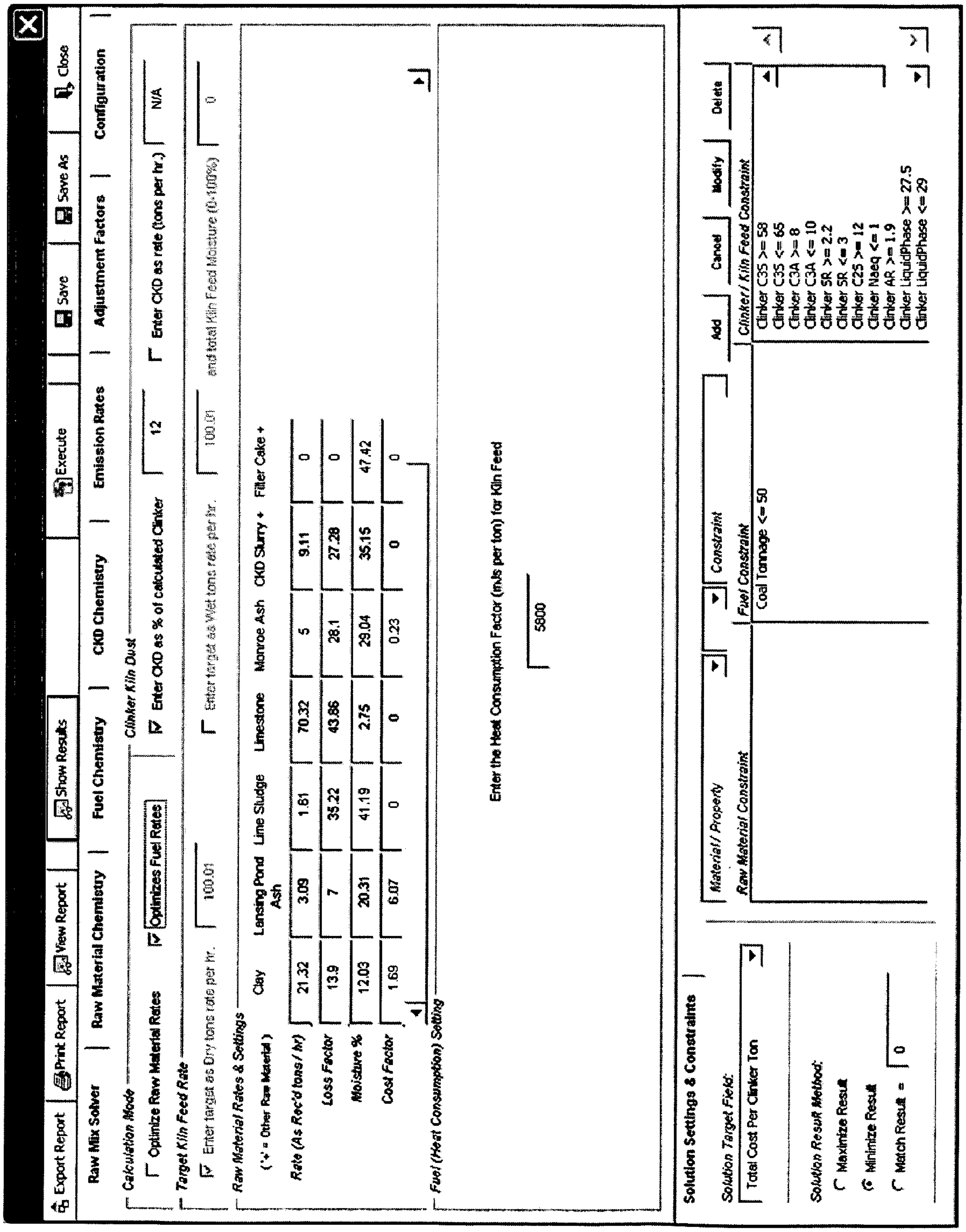
FIG. 13 is a screen-shot illustrating a calculation mode set to optimize fuel rates only for a feed rate optimizer according to the present invention.

When fuel feed rates only are selected for optimization in step 114, the feed rate optimizer proceeds with grouped steps 144 (FIG. 13). The feed rate optimizer 46 receives raw material feed rate data in step 146. (FIG. 13). The raw material feed rates correspond to the feed rates of the various raw material feeders 26, 28, 29, 30, 31. In this way, optimized fuel feed rates are calculated based on the inputted raw material feed rates.

The feed rate optimizer 46 receives CKD rate data in step 148. (FIG. 13). CKD rate data is described above with reference to step 120. The feed rate optimizer receives kiln feed heat consumption data in step 150. (FIG. 13). Kiln feed heat consumption data is described above with reference to step 122.

Constraints are received by the feed rate optimizer 46 in step 152. Referring now to FIG. 2D, steps for receiving constraints for optimization of fuel rates only are displayed. As can be appreciated, steps displayed in FIG. 2D are encapsulated by step 152 of FIG. 2A. Fuel constraints are received in step 214. Fuel constraints are described above with reference to step 202. Clinker composition constraints are received in step 216. Clinker composition constraints are described above with reference to step 204. Kiln feed composition constraints are received in step 218. Kiln feed composition constraints are described above with reference to 206. Raw material constraints are not received, as specified raw material rates were received in step 146.

Referring again to FIG. 2A, the solution target field is received in step 154. The solution target field is described above with reference to step 126.

In step 156, the feed rate optimizer calculates optimized fuel feed rates based on the selected inputs and constraints, and based on the inputted raw material feed rate, when the user presses the "Execute" button (FIG. 13).

Figure 14:
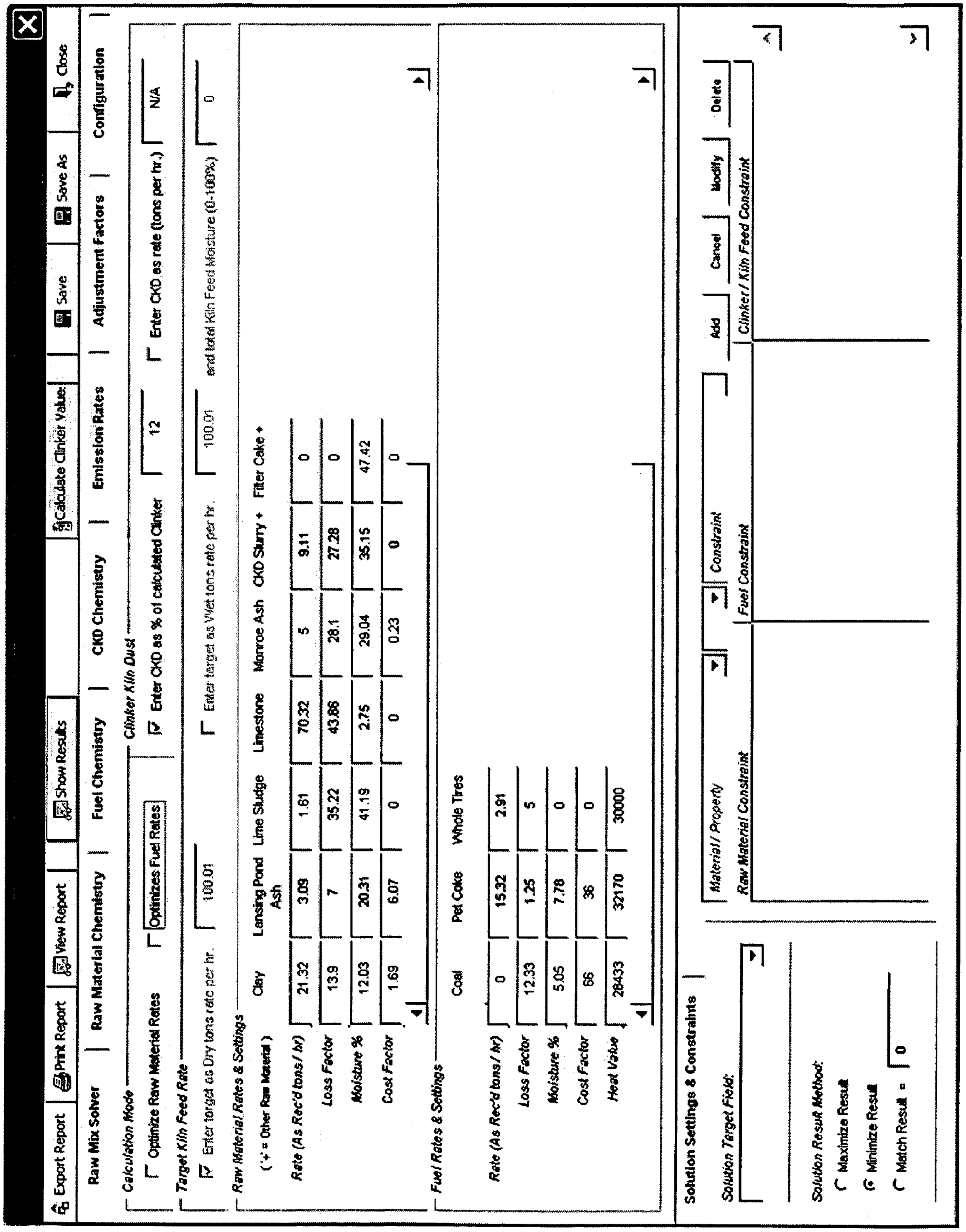
FIG. 14 is a screen shot illustrating a calculation mode set to calculate a clinker composition for a feed rate optimizer according to the present invention.

When neither raw material feed rates nor fuel feed rates are selected for optimization in step 114, the feed rate optimizer 46 proceeds with grouped steps 158. (FIG. 14). Grouped steps 158 correspond to the fourth mode of operation, wherein the feed rate optimizer 46 calculates an expected clinker composition based on inputted raw material and feed rates. (FIG. 14).

The feed rate optimizer 46 receives raw material feed rate data in step 160. The feed rate optimizer 46 receives CKD rate data in step 161. The feed rate optimizer receives fuel feed rate data in step 162. In step 164, the feed rate optimizer calculates expected clinker composition based on the inputted raw material rate data, CKD rate data, fuel feed rate, and emissions data, when the user presses the "Calculate Clinker Value" button (FIG. 14).

Figure 18:
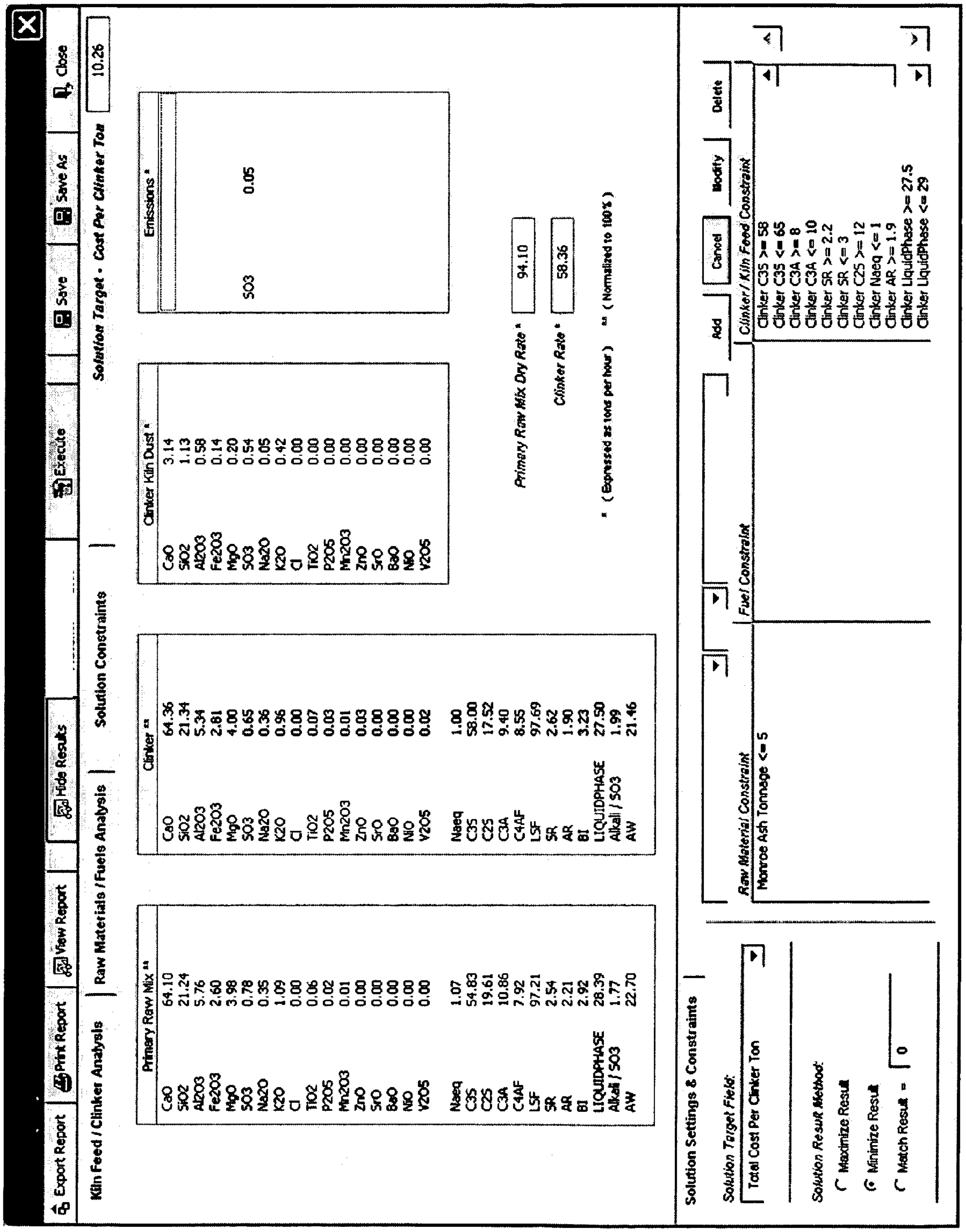
FIG. 18 is a screen-shot illustrating kiln feed/clinker analysis output of a feed rate optimizer according to the present invention.
Figure 19:
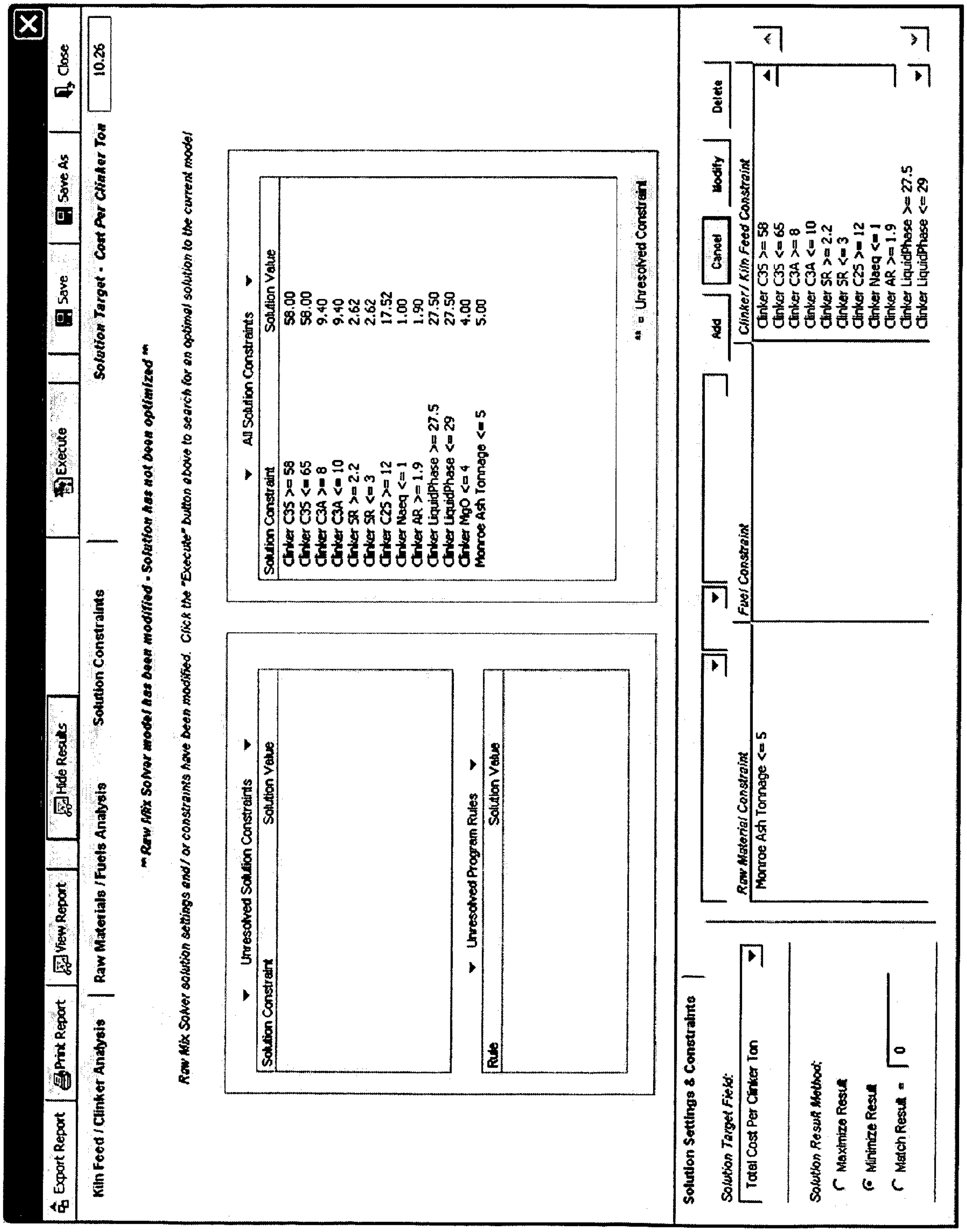
FIG. 19 is a screen-shot illustrating solution constraint output of a feed rate optimizer according to the present invention.
Figure 20:
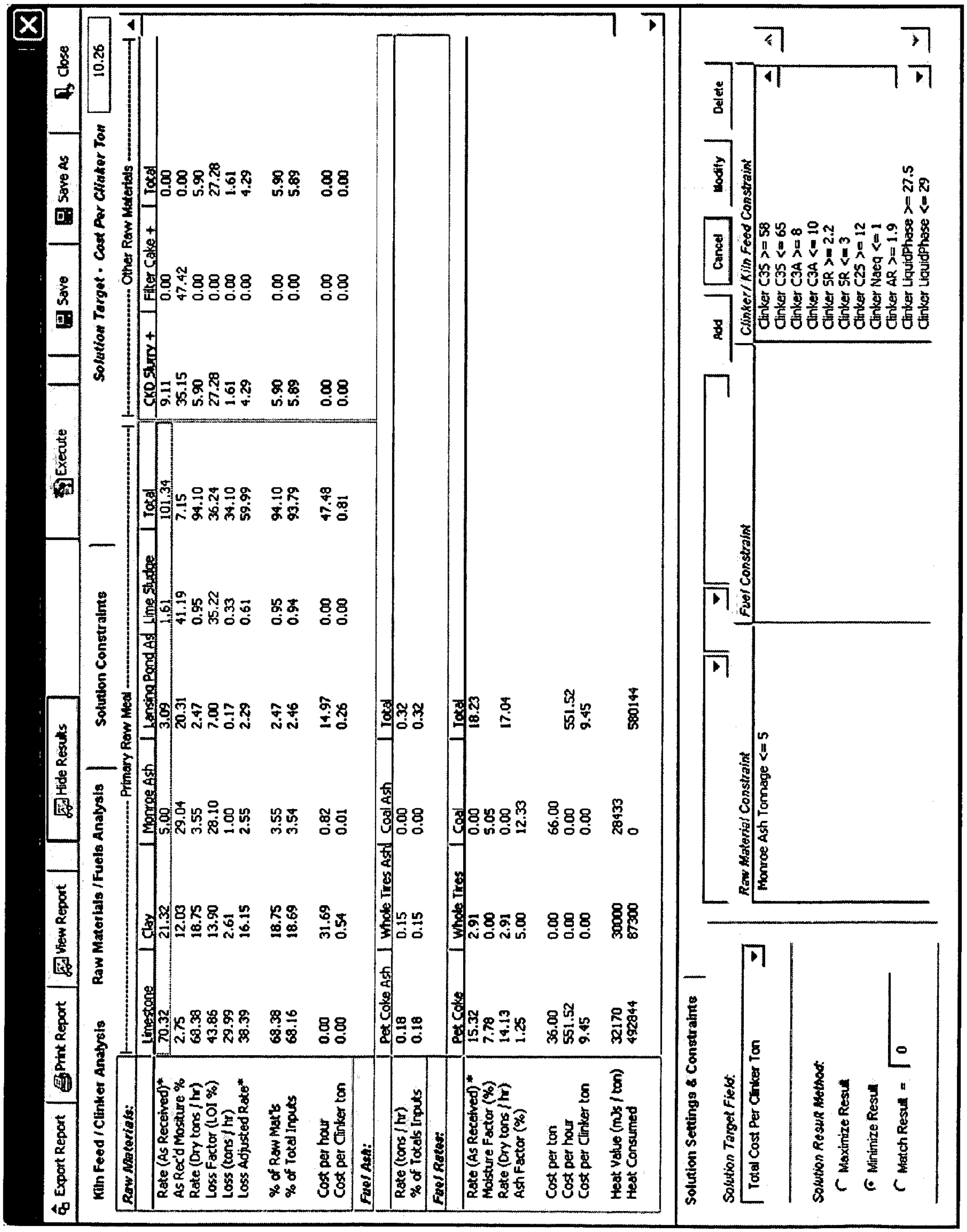
FIG. 20 is a screen-shot illustrating fuel and raw material feed rate output of a feed rate optimizer according to the present invention.

Calculation results are displayed by clicking the "Show Results" button (FIGS. 11-14). Three result tabs are displayed: "Kiln Feed/Clinker Analysis", "Raw Materials/Fuels Analysis", and "Solution Constraints." (FIGS. 18-20). The "Kiln Feed/Clinker Analysis" (FIG. 18) and the "Solution Constraints" (FIG. 19) tabs allow the quality control operator to quickly review the raw mix and clinker composition, and make modifications where needed. Additionally, the quality control operator may add or delete constraints, and re-execute the program.

By selecting the "Raw Materials/Fuels Analysis" tab, optimized raw material and fuel rates are displayed (FIG. 20). For each raw material, a rate (as received) in tons per hour is displayed. For example, in FIG. 20, the following optimized raw material rates are displayed:

Limestone: 70.32;
Clay: 21.32;
Monroe Ash: 5.00;
Lansing Pond Ash: 3.09;
Lime Sludge: 1.61;
CKD slurry: 9.11;
Filter Cake: 0.00.

Optimized fuel rates are also displayed (FIG. 20):
Pet Coke: 15.32;
Whole Tires: 2.91; and
Coal: 0.00.

The fuel and raw material rates displayed in FIG. 20 represent the optimized fuel rates calculated by the optimizer, given the received data and constraints, for the selected target field. Other solution data displayed includes the rate of fuel ash for each fuel specified, the cost per hour, and cost per clinker ton corresponding to the specified fuel and raw material rates. (FIG. 20).

Based on the raw material and fuel feed rates generated by the feed rate optimizer in step 128, the quality control operator may adjust actual fuel and/or raw material rates for the kiln plant system. With reference to FIGS. 1*a* and 1*b*, the optimized feed rates from the feed rate optimizer 46 are received by the feeder control module 32, which controls the feeders 26, 28, 29, 30, 31, 40, 44, 45 as described above. It is understood that the optimized feed rates may alternatively be received by the feeder control module 32 by a data communication connection.

Once initial feed rates are determined, the feed rate optimizer 46 may be periodically updated with measured data from the system. In such case, new optimized fuel and/or raw material rates may be generated by the feed rate optimizer 46 based on the revised system data. In this way, the quality control operator is provided with optimized fuel and/or raw material rates periodically, as conditions in the system change and evolve over time.

Figure 21:
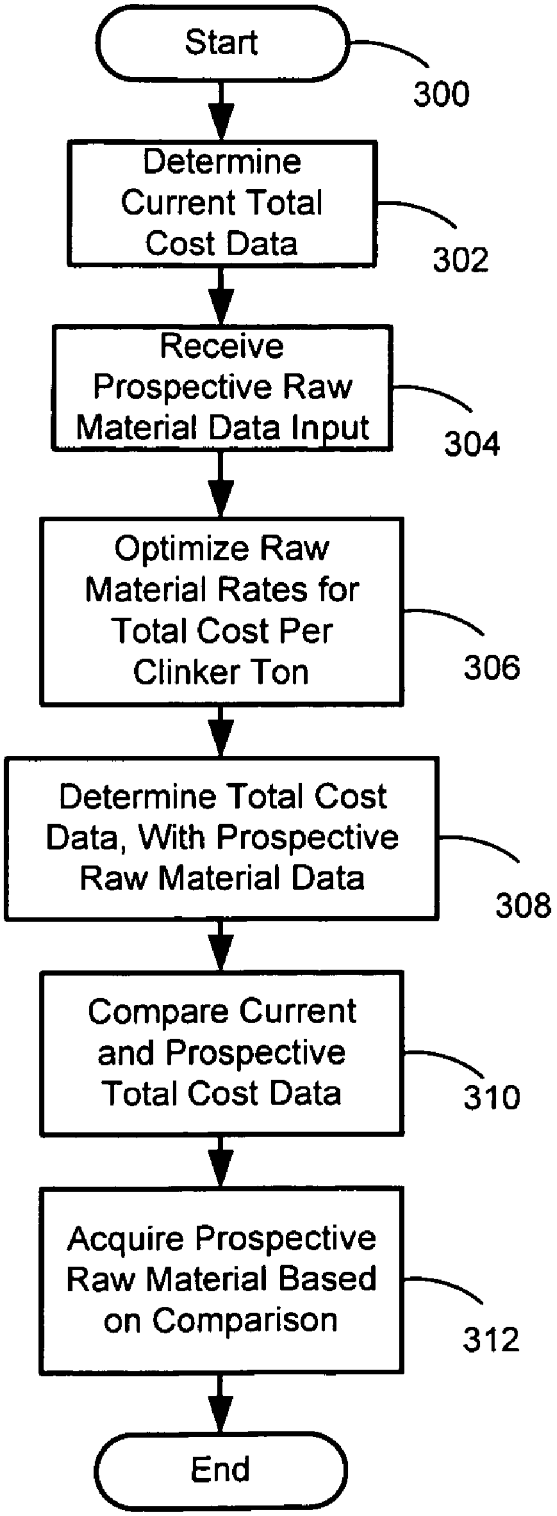
FIG. 21 is a flowchart illustrating steps performed by a feed rate optimizer to compare current cost data with cost data for a prospective raw material according to the present invention.

The feed rate optimizer 46 may also be used as a forecasting tool to determine the effect of a prospective raw material or fuel on total cost. With reference to FIG. 21, steps for forecasting begin at step 300. In step 302, the current total cost data is determined based on the operation of the feed rate optimizer 46, as described above, utilizing current kiln plant system data. In step 304, prospective raw material data input is received. In step 306, the feed rate optimizer 46 generates raw material feed rates based on the prospective raw material data. In step 308, the feed rate optimizer 46 determines total cost data based on the prospective raw material data input.

In step 310, the prospective total cost data, as determined in step 308, is compared with the current total cost data, as determined in step 302. In step 312, the prospective raw material is acquired based on the comparison of step 310. Generally, when the prospective new material reduces overall costs, it is acquired. In this way, the effect of a prospective raw material on total cost may be evaluated prior to acquisition of the prospective raw material.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of optimizing feed rates for a cement kiln plant comprising:

receiving raw material data associated with raw material for said cement kiln plant, fuel data associated with fuel for said cement kiln plant, clinker kiln dust data associated with clinker kiln dust from said cement kiln plant, and emissions data associated with emissions from said cement kiln plant;

receiving a user inputted clinker composition constraint indicating a composition of clinker resulting from said cement kiln plant;

receiving a user inputted solution target parameter and a user inputted selection to minimize said solution target parameter, to maximize said solution target parameter, or to match said solution target parameter to an inputted value;

calculating at least one of a raw material feed rate and a fuel feed rate with a processor, based on said raw material data, said fuel data, said clinker kiln dust data, and said emissions data, such that said raw material feed rate and said fuel feed rate result in a clinker composition meeting said clinker composition constraint and in said solution target parameter being minimized, maximized, or matched to said inputted value, according to said user inputted selection; and setting a cement kiln feeder based on at least one of said calculated raw material feed rate and said calculated fuel feed rate.

2. The method of claim 1 wherein said received solution target parameter is a total cost.

3. The method of claim 1 wherein said received solution target parameter is a total raw material cost.

4. The method of claim 1 wherein said received raw material data comprises at least one of raw material composition data, raw material loss factor data, raw material moisture data, and raw material cost data.

5. The method of claim 1 wherein said received fuel data comprises at least one of fuel composition data, fuel moisture data, fuel cost data, fuel ash factor data, and fuel heat value data.

6. The method of claim 1 wherein said received clinker kiln dust data comprises at least one of clinker kiln dust composition data, clinker kiln dust loss factor data, and clinker kiln dust rate data.

7. The method of claim 1 wherein said received emissions data comprises at least one of emissions composition data and emissions rate data.

8. The method of claim 1 further comprising receiving kiln feed heat consumption factor data wherein said calculated fuel feed rate is based on said kiln feed heat consumption factor data.

9. The method of claim 1 further comprising selecting at least one of a dicalcium silicate formula, a liquid phase formula, a coating tendency formula, and a lime saturation factor formula wherein at least one of said calculated raw material feed rate and said calculated fuel feed rate are based on at least one of said selected dicalcium silicate formula, said selected liquid phase formula, said selected coating tendency formula, and said selected saturation factor formula.

10. The method of claim 1 further comprising receiving at least one of a raw material composition constraint, a fuel composition constraint, and a raw mix composition constraint wherein at least one of said calculated raw material feed rate and said calculated fuel feed rate are based on at least one of said raw material composition constraint, said fuel composition constraint, and said raw mix composition constraint.

11. The method of claim 1 wherein said received solution target parameter is an amount of a raw material.

12. A feeder control system for a cement kiln plant comprising:

a feed rate optimizer that receives raw material data, fuel data, clinker kiln dust data, emissions data, a clinker composition constraint, a solution target parameter, and a selection to minimize said solution target parameter, to maximize said solution target parameter, or to match said solution target parameter to an inputted value, and that calculates, based on said raw material data, said fuel data, said clinker kiln dust data, and said emissions data, at least one of a raw material feed rate and a fuel feed rate that minimizes said solution target parameter, maximizes said solution target parameter, or matches said solution target parameter to said inputted value, according to said selection, and that results in a clinker composition meeting said clinker composition constraint; and a kiln feeder control module that sets at least one cement kiln plant feeder according to at least one of said calculated raw material feed rate and said calculated fuel feed rate.

13. The feeder control system of claim 12 wherein said solution target parameter is a total cost.

14. The feeder control system of claim 12 wherein said solution target parameter is a total raw material cost.

15. The feeder control system of claim 12 wherein said raw material data comprises at least one of raw material composition data, raw material loss factor data, raw material moisture data, and raw material cost data.

16. The feeder control system of claim 12 wherein said fuel data comprises at least one of fuel composition data, fuel moisture data, fuel cost data, fuel ash factor data, and fuel heat value data.

17. The feeder control system of claim 12 wherein said clinker kiln dust data comprises at least one of clinker kiln dust composition data, clinker kiln dust loss factor data, and clinker kiln dust rate data.

18. The feeder control system of claim 12 wherein said received emissions data comprises at least one of emissions composition data and emissions rate data.

19. The feeder control system claim 12 wherein said feed rate optimizer receives kiln feed heat consumption factor data and calculates said fuel feed rate based on said kiln feed heat consumption factor data.

20. The feeder control system of claim 12 wherein:

said feed rate optimizer receives at least one of a selected dicalcium silicate formula, a selected liquid phase formula, a selected coating tendency formula, and a selected lime saturation factor formula; and calculates said raw material feed rate based on at least one of said selected dicalcium silicate formula, said selected liquid phase formula, said selected coating tendency formula, and said selected saturation factor formula.

21. The feeder control system of claim 12 wherein:

said feed rate optimizer receives at least one of a selected dicalcium silicate formula, a selected liquid phase formula, a selected coating tendency formula, and a selected lime saturation factor formula; and calculates said fuel feed rate based on at least one of said selected dicalcium silicate formula, said selected liquid phase formula, said selected coating tendency formula, and said selected saturation factor formula.

22. The feeder control system of claim 12 wherein:

said feed rate optimizer receives at least one of a raw material composition constraint, a fuel composition constraint, and a raw mix composition constraint; and calculates said raw material feed rate based on at least one of said raw material composition constraint, said fuel composition constraint, and said raw mix composition constraint.

23. The feeder control system of claim 12 wherein:

said feed rate optimizer receives at least one of a raw material composition constraint, a fuel composition constraint, and a raw mix composition constraint; and calculates said fuel feed rate based on at least one of said raw material composition constraint, said fuel composition constraint, and said raw mix composition constraint.

24. The feeder control system of claim 12 wherein said solution target parameter is an amount of a raw material.

25. A method of evaluating the cost of a prospective raw material for a cement kiln plant comprising:

receiving current raw material data, prospective raw material data, fuel data, clinker kiln dust data, and emissions data;

calculating a current total cost based on said current raw material data, said fuel data, said clinker kiln dust data, and said emissions data;

calculating a prospective total cost based on said prospective raw material data, said fuel data, said clinker kiln dust data, and said emissions data;

comparing said current total cost per clinker ton with said prospective total cost per clinker ton; and acquiring said prospective raw material based on said comparing.

26. The method of claim 25 wherein said received current raw material data comprises at least one of current raw material composition data, current raw material loss factor data, current raw material moisture data, and current raw material cost data.

27. The method of claim 25 wherein said received prospective raw material data comprises at least one of prospective raw material composition data, prospective raw material loss factor data, prospective raw material moisture data, and prospective raw material cost data.

28. The method of claim 25 wherein said received fuel data comprises at least one of fuel composition data, fuel moisture data, fuel cost data, fuel ash factor data, and fuel heat value data.

29. The method of claim 25 wherein said received clinker kiln dust data comprises at least one of clinker kiln dust composition data, clinker kiln dust loss factor data, and clinker kiln dust rate data.

30. The method of claim 25 wherein said received emissions data comprises at least one of emissions composition data and emissions rate data.

31. The method of claim 25 further comprising selecting at least one of a dicalcium silicate formula, a liquid phase formula, a coating tendency formula, and a lime saturation factor formula wherein said current total cost and said prospective total cost are based on at least one of said selected dicalcium silicate formula, said liquid phase formula, said coating tendency formula, and said lime saturation factor formula.

32. A method of calculating cement kiln plant data comprising:

receiving raw material data associated with raw material for a cement kiln plant, fuel data associated with fuel for said cement kiln plant, clinker kiln dust data associated with clinker kiln dust from said cement kiln plant, and emissions data associated with emissions from said cement kiln plant;

receiving a user inputted calculation mode selection from a plurality of calculation modes including a first mode wherein both a raw material feed rate and a fuel feed rate are optimized, a second mode wherein said raw material feed rate is inputted and said fuel feed rate is optimized, a third mode wherein said raw material feed rate is optimized and said fuel feed rate is inputted, and a fourth mode wherein said raw material feed rate and said fuel feed rate are inputted;

calculating said raw material feed rate and said fuel feed rate with a processor, based on said raw material data, said fuel data, said clinker kiln dust data, and said emissions data, when said first mode is selected;

calculating said fuel feed rate with said processor, based on said raw material data, said fuel data, said clinker kiln dust data, and said emissions data, when said second mode is selected;

calculating said raw material feed rate with said processor, based on said raw material data, said fuel data, said clinker kiln dust data, and said emissions data, when said third mode is selected;

calculating an expected clinker composition with said processor, based on said raw material data, said fuel data, said clinker kiln dust data, said emissions data, said raw material feed rate and said fuel feed rate, when said fourth mode is selected;

setting a raw material feeder based on said raw material feed rate and a fuel feeder based on said fuel feed rate when said first, second, and third modes are selected;

generating an output indicating said calculated expected clinker composition when said fourth mode is selected.

33. The method of claim 32 further comprising:

receiving a solution target parameter and a selection to minimize said solution target parameter, to maximize said solution target parameter, or to match said solution target parameter to an inputted value when said first, second, and third modes are selected; and calculating at least one of said raw material feed rate and said fuel feed rate by minimizing said solution target parameter, maximizing said solution target parameter, or matching said solution target parameter to said inputted value, according to said selection.

34. The method of claim 32 further comprising receiving a raw material composition constraint when said first, second, or third modes are selected, wherein at least one of said raw material feed rate and said fuel feed rate are based on said raw material composition constraint.

35. The method of claim 32 further comprising receiving a target kiln feed rate when said first, second, or third modes are selected wherein at least one of said raw material feed rate and said fuel feed rate are based on said target kiln feed rate.

36. The method of claim 32 further comprising receiving a fuel composition constraint when said first, second, or third modes are selected, wherein at least one of said raw material feed rate and said fuel feed rate are based on said fuel composition constraint.

* * * * *